US010539231B2

(12) United States Patent
Kobayashi et al.

(10) Patent No.: US 10,539,231 B2
(45) Date of Patent: Jan. 21, 2020

(54) SHIFT CONTROL APPARATUS FOR VEHICLE

(71) Applicant: Toyota Jidosha Kabushiki Kaisha, Toyota-shi, Aichi (JP)

(72) Inventors: Nobufusa Kobayashi, Anjo (JP); Masato Yoshikawa, Toyota (JP); Kenta Kumazaki, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 181 days.

(21) Appl. No.: 15/828,642

(22) Filed: Dec. 1, 2017

(65) Prior Publication Data

US 2018/0156331 A1 Jun. 7, 2018

(30) Foreign Application Priority Data

Dec. 5, 2016 (JP) ................................ 2016-236255

(51) Int. Cl.
 *F16H 61/06* (2006.01)
 *F16H 61/08* (2006.01)
 (Continued)

(52) U.S. Cl.
 CPC ........... *F16H 61/061* (2013.01); *B60K 6/547* (2013.01); *F16H 61/08* (2013.01);
 (Continued)

(58) Field of Classification Search
 CPC ..... F16H 61/061; F16H 61/0437; F16H 61/08
 See application file for complete search history.

(56) References Cited

U.S. PATENT DOCUMENTS

2004/0043867 A1* 3/2004 Sato ...................... F16H 61/061
 477/144
2008/0258474 A1 10/2008 Tabata et al.
(Continued)

FOREIGN PATENT DOCUMENTS

JP 2014-105741 6/2014

*Primary Examiner* — Edwin A Young
(74) *Attorney, Agent, or Firm* — Oblon, McClelland, Maier & Neustadt, L.L.P.

(57) ABSTRACT

A shift control apparatus (80) for a vehicle (10; 100) provided with a drive power source (39; MG), and a step-variable transmission portion (20; 110) including a plurality of hydraulically operated coupling devices (CB), the shift control apparatus controlling the step-variable transmission portion to implement a shifting action with an engaging action of the engaging-side coupling device and a releasing action of the releasing-side coupling device, and including a shift control portion (82) to control a shift-down action of the step-variable transmission portion in a predetermined mode of hydraulic control of the engaging-side and releasing-side coupling devices, wherein the shift control portion controls the engaging-side and releasing-side coupling devices in a non-vehicle-driving control mode during the shift-down action of the step-variable transmission portion in a non-driving state of the vehicle, the shift control portion switching the mode of hydraulic control from the non-vehicle-driving control mode to a vehicle-driving control mode where the vehicle is switched from the non-driving state to a driving state within a predetermined length of time after a moment of initiation of the shift-down action, and maintaining the non-vehicle-driving control mode where the vehicle is switched to the driving state after the predetermined length of time has passed, while limiting a torque of the drive power source during the shift-down action to a predetermined value in the non-vehicle-driving control mode.

12 Claims, 8 Drawing Sheets

(51) Int. Cl.
*B60K 6/547* (2007.10)
*F16H 61/04* (2006.01)
*F16H 61/686* (2006.01)

(52) U.S. Cl.
CPC ........ *B60K 2702/02* (2013.01); *F16H 61/686* (2013.01); *F16H 2061/0459* (2013.01)

(56) References Cited

U.S. PATENT DOCUMENTS

| | | | |
|---|---|---|---|
| 2010/0105521 A1* | 4/2010 | Kondo | F16H 61/061 477/115 |
| 2010/0191430 A1 | 7/2010 | Kobayashi et al. | |
| 2010/0294065 A1* | 11/2010 | Funakoshi | F16H 61/0021 74/473.11 |

* cited by examiner

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

| OVERALL SPEED POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

SHIFT CONTROL APPARATUS FOR VEHICLE

This application claims priority from Japanese Patent Application No. 2016-236255 filed on Dec. 5, 2016, the disclosure of which is herein incorporated by reference in its entirety.

FIELD OF THE INVENTION

The present invention relates to a shift control apparatus for a vehicle provided with a drive power source and a step-variable transmission portion.

BACKGROUND OF THE INVENTION

There is known a shift control apparatus for a vehicle provided with a drive power source, and a step-variable transmission portion disposed in a power transmitting path between the drive power source and drive wheels and having a plurality of hydraulically operated coupling devices, which shift control apparatus controls the step-variable transmission portion to implement a shifting action with an engaging action of the engaging-side coupling device to be brought into its engaged state to implement the shifting action, and a releasing action of the releasing-side coupling device to be brought into its released state. JP-2014-105741A discloses an example of this type of shift control apparatus for a vehicle. This publication describes that a mode of hydraulic control of the engaging-side and releasing-side coupling devices is switched from a non-vehicle-driving mode to a vehicle-driving mode, when the vehicle is switched from a non-vehicle-driving state (non-driving state) to a vehicle-driving state (driving state) during a shift-down action of the step-variable transmission portion initiated in the non-driving state of the vehicle.

The shift-down action of the step-variable transmission portion can adequately progress with a high degree of response, by switching the mode of hydraulic control of the coupling devices from the non-vehicle-driving mode to the vehicle-driving mode when the vehicle is switched from the non-driving state to the driving state during the shift-down action, as described in the publication JP-2014-105741A. If, for example, the mode of hydraulic control is switched to the vehicle-driving mode after the shift-down action in the non-driving state has sufficiently progressed (after a moment of initiation of an inertia phase of the shift-down action, for instance), however, it is difficult to implement a speed control of the step-variable transmission portion during the inertia phase, so that an inertial power of the step-variable transmission portion varies, with a result of loss of a power balance among an engine power, the inertial power and a power (vehicle drive power) transmitted through the coupling devices, giving rise to a risk of generation of a shifting shock of the step-variable transmission portion. Where the drive power source provided in the vehicle includes an electric motor, the shift-down action of the step-variable transmission portion is controlled by taking account of a power balance involving a battery power, in addition to the above-indicated engine power, inertial power and vehicle drive power, so that where the battery power is limited upon switching of the vehicle from the non-driving state to the driving state in the process of the shift-down action, the loss of the power balance is further aggravated, and the risk of generation of the shifting shock is increased.

SUMMARY OF THE INVENTION

The present invention was made in view of the background art described above. It is therefore an object of the present invention to provide a shift control apparatus for a vehicle provided with a drive power source, and a step-variable transmission portion having a plurality of hydraulically operated coupling devices, which shift control apparatus is configured to reduce a shifting shock of the step-variable transmission portion even when the vehicle is switched from its non-driving state to its driving state during a shift-down action of the step-variable transmission portion initiated in the non-driving state of the vehicle.

The object indicated above is achieved according to the following modes of the present invention:

According to a first mode of the invention, there is provided a shift control apparatus for a vehicle provided with a drive power source, and a step-variable transmission portion disposed in a power transmitting path between the drive power source and drive wheels and including a plurality of hydraulically operated coupling devices, the shift control apparatus controlling the step-variable transmission portion to implement a shifting action with an engaging action of the engaging-side coupling device to be brought into its engaged state to implement the shifting action, and a releasing action of the releasing-side coupling device to be brought into its released state, said shift control apparatus comprising a shift control portion configured to control a shift-down action of the step-variable transmission portion in a predetermined mode of hydraulic control of the engaging-side and releasing-side coupling devices, and wherein the shift control portion controls the engaging-side and releasing-side coupling devices in a non-vehicle-driving control mode during the shift-down action of the step-variable transmission portion in a non-driving state of the vehicle, the shift control portion switching the mode of hydraulic control from the non-vehicle-driving control mode to a vehicle-driving control mode where the vehicle is switched from the non-driving state to a driving state during the shift-down action, within a predetermined length of time after a moment of initiation of the shift-down action, and maintaining the non-vehicle-driving control mode where the vehicle is switched to the driving state after the predetermined length of time has passed from the moment of initiation of the shift-down action, while limiting a torque of the drive power source during the shift-down action to a predetermined value in the non-vehicle-driving control mode.

According to a second mode of the invention, the shift control apparatus according to the first mode of the invention is configured such that the predetermined length of time is set such that the predetermined length of time expires at latest before a moment of initiation of an inertia phase of the shift-down action of the step-variable transmission portion.

According to a third mode of the invention, the shift control apparatus according to the first or second mode of the invention is configured such that the shift control portion is configured to primarily control a hydraulic pressure of the releasing-side coupling device during the shift-down action of the step-variable transmission portion in the vehicle-driving mode, to permit the shift-down action to adequately progress, and configured to primarily control a hydraulic pressure of the engaging-side coupling device during the shift-down action in the non-vehicle-driving control mode, to permit the shift-down action to adequately progress.

According to a fourth mode of the invention, the shift control apparatus according to the third mode of the invention is configured such that the shift control apparatus is configured to temporarily raise the hydraulic pressure of the releasing-side coupling device to a predetermined value in the vehicle-driving mode when the shift control portion switches the mode of hydraulic control to the vehicle-driving control mode during the shift-down action of the step-variable transmission portion.

According to a fifth mode of the invention, the drive power source of the vehicle to be controlled by the shift control apparatus according to any one of the first through fourth modes of the invention includes an engine, a first electric motor, a differential mechanism, and a second electric motor operatively connected to an input shaft of the step-variable transmission portion in a power transmittable manner, the differential mechanism including a first rotary element operatively connected to the engine in a power transmittable manner, a second rotary element operatively connected to the first electric motor in a power transmittable manner, and a third rotary element operatively connected to the input shaft of the step-variable transmission portion.

The shift control apparatus according to the first mode of the present invention is configured to selectively establish one of the non-vehicle-driving control mode and the vehicle-driving control mode as the mode of hydraulic control of the step-variable transmission portion, depending upon whether the vehicle is switched from its non-driving state to its driving state within the predetermined length of time after the moment of initiation of the shift-down action. Accordingly, the present shift control apparatus permits not only a high degree of shifting response but also reduction of a shifting shock of the step-variable transmission portion. Where the vehicle is switched from the non-driving state to the driving state after the predetermined length of time has passed after the moment of initiation of the shift-down action, for instance, the non-vehicle-driving control mode is maintained, and output torque of the drive power source is limited to the predetermined value. Thus, the deterioration of a shifting response of the step-variable transmission portion can be reduced by maintaining the non-vehicle-driving control mode to permit the shift-down action to adequately progress. Further, the limitation of the output torque of the drive power source to the predetermined value reduces an amount of power variation of the drive power source, permitting an adequate progress of the shift-down action while reducing a loss of power balance of the drive power source and a risk of generation of the shifting shock, in spite of maintenance of the non-vehicle-driving control mode. Further, the output torque of the drive power source is limited to the predetermined value only after a predetermined length of time has passed from the moment of initiation of the shift-down action, so that the deterioration of the shifting response can be reduced. Where the vehicle is switched from the non-driving state to the driving state within the predetermined length of time after the moment of initiation of the shift-down action, on the other hand, the mode of hydraulic control of the step-variable transmission portion is switched from the non-vehicle-driving control mode to the vehicle-driving control mode in order to complete the shift-down action, whereby the shifting shock can be reduced. Further, the mode of hydraulic control is switched to the vehicle-driving control mode within the predetermined length of time after the moment of initiation of the shift-down action, namely, while the shift-down action is still in an initial stage of progress, so that it is possible to reduce the risks of generation of the shifting shock and deterioration of the shifting response due to switching of the mode of hydraulic control of the step-variable transmission portion.

According to the second mode of the invention wherein the predetermined length of time is set such that the predetermined length of time expires at latest before a moment of initiation of an inertia phase of the shift-down action of the step-variable transmission portion, the risk of generation of the shifting shock can be reduced. Where the vehicle is switched from the non-driving state to the driving state after the moment of initiation of the inertia phase, the shift-down action has sufficiently progressed, so that the switching of the mode of hydraulic control of the step-variable transmission portion to the vehicle-driving control mode in this condition gives rise to a risk of generation of the shifting shock due to changes of hydraulic pressures of the hydraulically operated coupling devices, and a risk of deterioration of the shifting response. However, the predetermined length of time is set as described above, so that the non-vehicle-driving control mode is maintained after the moment of initiation of the inertia phase, and the shift-down action adequately progresses in the non-vehicle-driving control mode, with reduced degrees of generation of the shifting shock and deterioration of the shifting response. Where the vehicle is switched from the non-driving state to the driving state before the moment of initiation of the inertia phase, on the other hand, the shift-down action of the step-variable transmission portion is still in the initial stage of progress upon switching of the vehicle to the driving state, so that the degrees of generation of the shifting shock and deterioration of the shifting response due to switching of the mode of hydraulic control to the vehicle-driving control mode are sufficiently restricted.

According to the third mode of the invention, the shift-down action of the step-variable transmission portion can be implemented so as to adequately progress by controlling the hydraulic pressure of the engaging-side coupling device, in the non-driving state of the vehicle in which the shift-down action can not adequately progress with an output torque of the drive power source. On the other hand, the rate of progress of the shift-down action can be adequately adjusted by controlling the hydraulic pressure of the releasing-side coupling device, in the driving state of the vehicle in which the output torque of the drive power source acting in the direction of permitting a progress of the shift-down action is transmitted to the step-variable transmission portion.

According to the fourth mode of the invention, the hydraulic pressure of the releasing-side coupling device is temporarily raised to a predetermined value, upon initiation of the hydraulic control of the step-variable transmission portion in the vehicle-driving control mode, so that the shift-down action is initiated again in the vehicle-driving control mode in place of the non-vehicle-driving control mode, and the shift-down action can be implemented by controlling the hydraulic pressure of the releasing-side coupling device.

According to the fifth mode of the invention, a sum of a directly transmitted output torque of the engine and an output torque of the second electric motor is transmitted to the input shaft of the step-variable transmission portion. Where an electric power amount of a battery is limited during the shift-down action, for example, the output torque of the engine is adjusted so that the drive power source outputs a required value of torque.

DETAILED DESCRIPTION OF PREFERRED EMBODIMENTS

Figure 1:
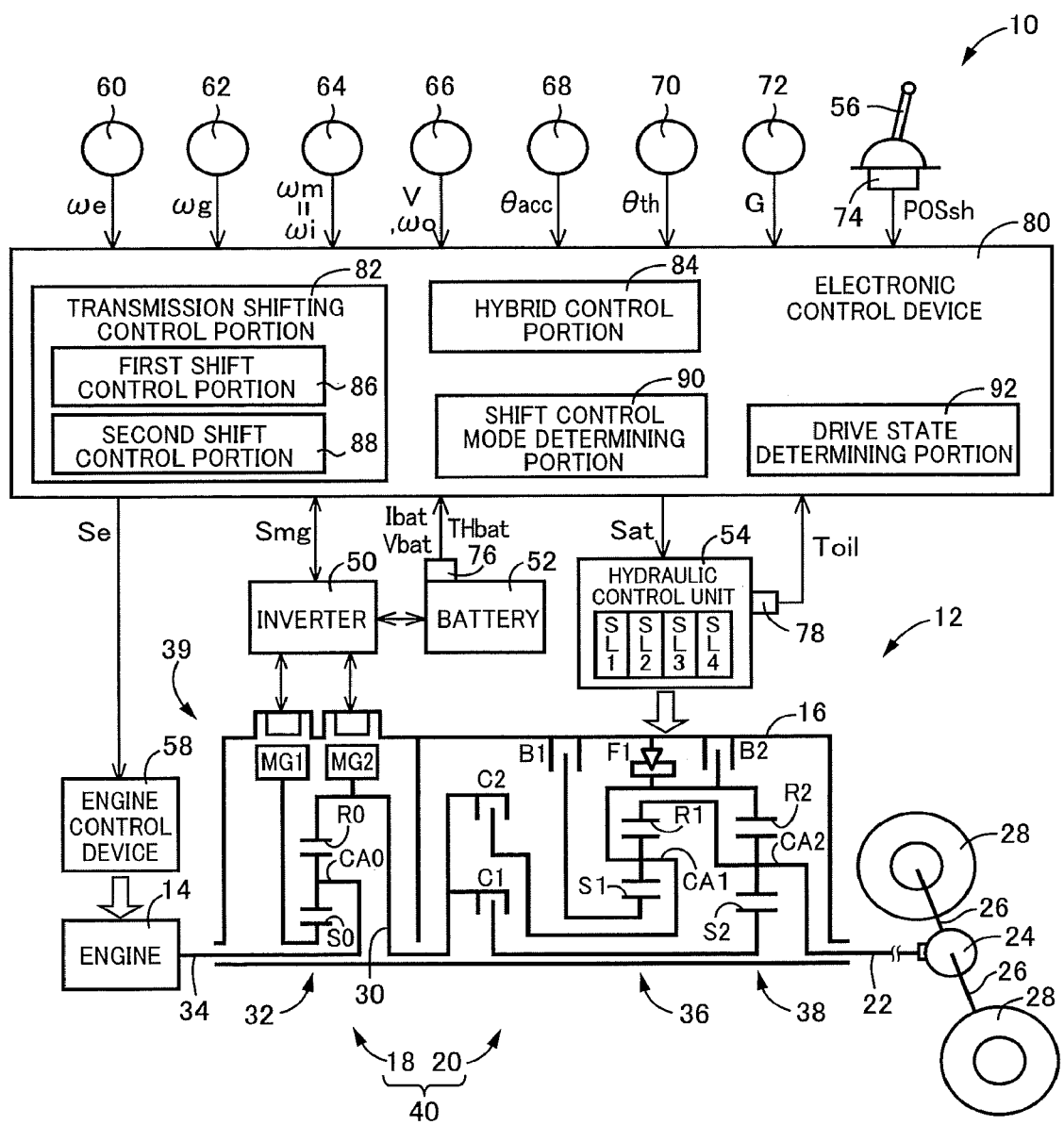
FIG. 1 is a schematic view showing an arrangement of a drive system of a vehicle to be controlled by a shift control apparatus according to the present invention, and major control functions and control portions of the shift control apparatus.

Referring to the drawings, preferred embodiments of the present invention will be described in detail. It is to be understood that the drawings are simplified and transformed as needed, and do not necessarily accurately represent the dimensions and shapes of various elements shown therein.

EMBODIMENTS

Reference is first made to FIG. 1, which is the schematic view showing an arrangement of a drive system 12 of a vehicle 10 to be controlled by a shift control apparatus according to the present invention, and major portions of the shift control apparatus to perform various controls of the vehicle 10. As shown in FIG. 1, the vehicular drive system 12 is provided with an engine 14 functioning as a drive power source, an electrically controlled continuously variable transmission portion 18 (hereinafter referred to as "continuously variable transmission portion 18") connected directly or indirectly via a damper (not shown) or any other device to the engine 14, and a mechanically operated step-variable transmission portion 20 (hereinafter referred to as "step-variable transmission portion 20") connected to an output rotary member of the continuously variable transmission portion 18. The continuously variable transmission portion 18 and the step-variable transmission portion 20 are disposed in series with each other within a transmission casing 16 (hereinafter referred to as "casing 16") functioning as a stationary member fixed to a body of the vehicle 10, such that the transmission portions 18 and 20 are disposed coaxially with each other on a common axis. The vehicular drive system 12 is further provided with a differential gear mechanism 24 connected to an output rotary member of the step-variable transmission portion 20 in the form of an output shaft 22, and a pair of axles 26 connected to the differential gear mechanism 24. In the vehicular drive system 12, a drive force ("drive torque" or "drive power" unless otherwise distinguished from the drive force) of the engine 14 and a second electric motor MG2 (described below) is transmitted to the step-variable transmission portion 20, and is transmitted from the step-variable transmission portion 20 to drive wheels 28 of the vehicle 10 through the differential gear mechanism 24 and other devices. The vehicular drive system 12 is suitably used in the vehicle 10 of an FR type (front-engine rear-drive type) in which the axis of the engine 14 is parallel to the longitudinal direction of the vehicle 10. It is noted that the continuously variable transmission portion 18 and the step-variable transmission portion 20 are constructed substantially symmetrically with each other about the axis of the engine 14 (about the above-indicated common axis), and that FIG. 1 does not show the lower halves of the transmission portions 18 and 20.

The engine 14 is the drive power source to drive the vehicle 10, which is a known internal combustion engine such as a gasoline engine or a diesel engine. An engine torque Te which is an output torque of this engine 14 is controlled by an electronic control device 80 (described below) which controls the operating condition of the engine 14 as represented by an opening angle of a throttle valve or an intake air quantity, an amount of injection of a fuel and an ignition timing. In the present embodiment, the engine 14 is connected to the continuously variable transmission portion 18, without a fluid-operated type power transmitting device such as a torque converter or a fluid coupling being disposed between the engine 14 and the transmission portion 18.

The continuously variable transmission portion 18 is provided with: a first electric motor MG1; a differential mechanism 32 functioning as a power distributing device to mechanically distribute the drive force of the engine 14 to the first electric motor MG1, and to an intermediate power transmitting member 30 which is an output rotary member of the continuously variable transmission portion 18; and the second electric motor MG2 operatively connected to the intermediate power transmitting member 30. The continuously variable transmission portion 18 is an electrically controlled continuously variable transmission wherein a differential state of the differential mechanism 32 is controllable by controlling an operating state of the first electric motor MG1. The first electric motor MG1 functions as a differential motor/generator (a differential motor) while the second electric motor MG2 is an electric motor which functions as a drive power source, namely, a vehicle driving motor/generator. The vehicle 10 is a hybrid vehicle provided with the drive power source in the form of the engine 14 and the second electric motor MG2. The engine 14 and continuously variable transmission portion 18 constitute a drive power source portion 39.

Each of the first electric motor MG1 and the second electric motor MG2 is an electrically operated rotary device having a function of an electric motor and a function of an electric generator. The first electric motor MG1 and the second electric motor MG2 are connected to an electric power storage device in the form of a battery 52 through an inverter 50. The inverter 50 provided on the vehicle 10 is controlled by the above-indicated electronic control device 80 described below, to control an output shaft torque (forward driving torque or regenerative torque) of each of the first and second electric motors MG1 and MG2, namely, an MG1 torque Tg, and an MG2 torque Tm. The battery 52 also provided on the vehicle 10 is the electric power storage device to and from which an electric power is supplied from and to the first electric motor MG1 and the second electric motor MG2.

The differential mechanism 32 is a planetary gear set of a single-pinion type having a sun gear S0, a carrier CA0 and a ring gear R0. The carrier CA0 is operatively connected to the engine 14 through a connecting shaft 34 in a power transmittable manner, and the sun gear S0 is operatively connected to the first electric motor MG1 in a power transmittable manner, while the ring gear R0 is operatively connected to the second electric motor MG2 in a power transmittable manner. In the differential mechanism 32, the carrier CA0 functions as an input rotary element, and the sun gear S0 functions as a reaction rotary element, while the ring gear R0 functions as an output rotary element.

The step-variable transmission portion 20 is a step-variable transmission which constitutes a part of a power transmitting path between the intermediate power transmitting member 30 and the drive wheels 28. The intermediate power transmitting member 30 also functions as an input shaft (input rotary member) of the step-variable transmission portion 20. The step-variable transmission portion 20 is considered to also constitute a part of a power transmitting path between the second electric motor MG2 and the drive wheels 28, since the second electric motor MG2 is connected to the intermediate power transmitting member 30 such that the intermediate power transmitting member 30 is rotated together with the second motor/generator MG2. The step-variable transmission portion 20 is a known automatic transmission of a planetary gear type which is provided with a plurality of planetary gear sets in the form of a first planetary gear set 36 and a second planetary gear set 38, and a plurality of hydraulically operated coupling devices in the form of a clutch C1, a clutch C2, a brake B1 and a brake B2 (hereinafter referred to as "coupling devices CB" unless otherwise specified).

Each of the coupling devices CB is a hydraulically operated frictional coupling device in the form of clutch or brake having friction plates or a friction plate that are/is operatively pressed by a hydraulic actuator, or a band brake that is operatively tightened by a hydraulic actuator. The coupling devices CB are selectively placed in engaged, slipped or released states with their engaging torques Tcb (torque capacities) being changed according to engaging hydraulic pressures Pcb applied thereto, which are regulated by respective solenoid-operated valves SL1-SL4 incorporated within a hydraulic control unit 54. In order for each coupling device CB to be able to transmit a torque (for example, an AT input shaft torque Ti which is an input shaft torque of the step-variable transmission portion 20) between the intermediate power transmitting member 30 and the output shaft 22, without a slipping action (without a speed difference between input and output elements of the coupling device CB), the relevant coupling device CB should be given an engaging torque Tcb enough to permit transmission of a component of the input shaft torque, which is assigned to be transmitted by the coupling device CB in question, that is, to permit transmission of an assigned torque (CB-transmitted torque) to be transmitted through the coupling device CB. However, it is noted that an increase of the engaging torque Tcb enough to obtain the CB-transmitted torque does not cause an increase of the CB-transmitted torque. That is, the engaging torque Tcb is equivalent to a maximum value of the torque that can be transmitted through the coupling device CB, and the CB-transmitted torque is equivalent to the torque that is actually transmitted through the coupling device CB. It is noted that the engaging torque Tcb (CB-transmitted torque) and the engaging hydraulic pressure Pcb are proportional to each other, before the engaging hydraulic pressure Pcb has been raised to initiate an engaging contact of the input and output elements with each other.

In the step-variable transmission portion 20, selected ones of rotary elements (sun gears S1 and S2, carriers CA1 and CA2, and ring gears R1 and R2) of the first and second planetary gear sets 36 and 38 are connected to each other or to the intermediate power transmitting member 30, casing 16 or output shaft 22, either directly or indirectly (selectively) through the coupling devices CB or a one-way clutch F1.

The step-variable transmission portion 20 is shifted to a selected one of four AT gear positions (speed positions) by engaging actions of selected ones of the coupling devices CB. These four AT gear positions have respective different speed ratios γat (=AT input shaft speed ωi/AT output shaft speed ωo). The AT input shaft speed ωi is a rotating speed (angular velocity) of the input shaft of the step-variable transmission portion 20, that is, a rotating speed of the intermediate power transmitting member 30, which is equal to an MG2 speed ωm which is an operating speed of the second electric motor MG2. Namely, the AT input shaft speed ωi can be represented by the MG2 speed ωm. The AT output shaft speed ωo is a rotating speed of the output shaft 22 of the step-variable transmission portion 20, which is considered to be an output shaft speed of a transmission device 40 which consists of the continuously variable transmission portion 18 and the step-variable transmission portion 20.

Figures 2, 3:
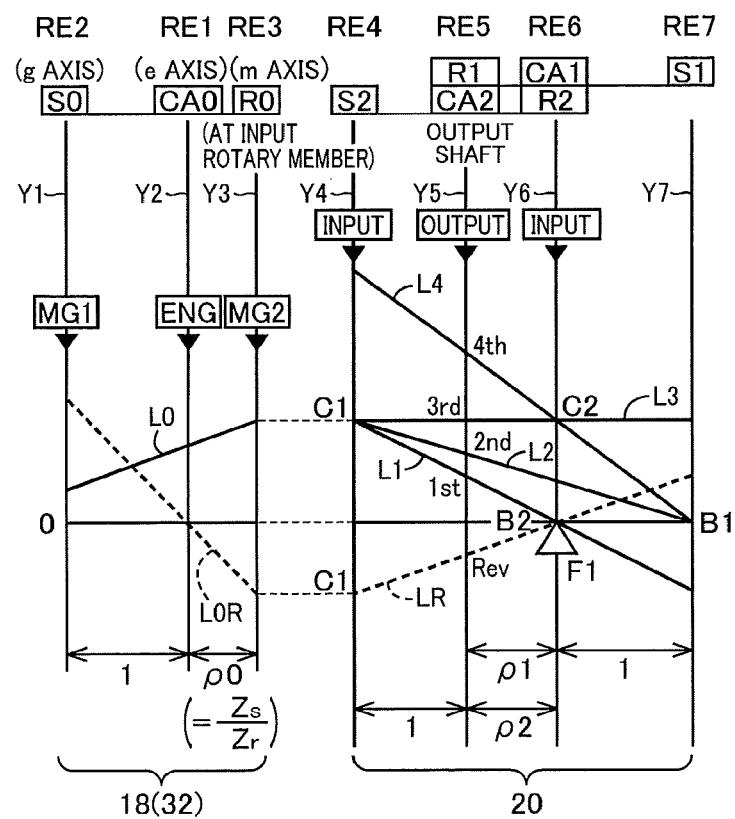
FIG. 2 is a table indicating a relationship between gear positions of a mechanically operated step-variable transmission portion shown in FIG. 1 and combinations of coupling devices placed in engaged states to establish the respective gear positions.
FIG. 3 is a collinear chart indicating a relationship among rotating speeds of rotary elements of an electrically controlled continuously variable transmission portion also shown in FIG. 1 and the mechanically operated step-variable transmission portion.

Reference is now made to FIG. 2, which is the table indicating the relationship between the first through fourth speed AT gear positions of the step-variable transmission portion 20 shown in FIG. 1 and combinations of the coupling devices CB placed in the engaged states to establish the respective AT gear positions. In the table, the four forward drive AT gear positions are respectively represented by "$1^{st}$", "$2^{nd}$", "$3^{rd}$" and "$4^{th}$". The first speed AT gear position "$1^{st}$" has a highest speed ratio γat, and the speed ratios γat of the four AT gear positions decrease in the direction from the first speed AT gear position (lowest-speed gear position) "$1^{st}$" toward the fourth speed AT gear position (highest-speed gear position) $4^{th}$. In the table, "O" indicates the engaged state of the coupling devices CB, "Δ" indicates the engaged state of the coupling device B2 during application of an engine brake to the vehicle 10 or during a shift-down action of the step-variable transmission portion 20 while the vehicle 10 is in a coasting run, while the blank indicates the released state of the coupling devices CB. The one-way clutch F1 indicated above is disposed in parallel to the brake B2 which is placed in the engaged state to establish the first speed AT gear position "$1^{st}$", so that the brake B2 is not required to be placed in the engaged state upon starting or acceleration of the vehicle 10. The above-indicated shift-down action of the step-variable transmission portion 20 in the coasting run of the vehicle 10 is a kind of "power-off shift-down action" which is required as a result of reduction of a vehicle-speed-related value (vehicle running speed V, for example) due to reduction of a required drive force (as represented by an operation amount θacc of an accelerator pedal) or during deceleration of the vehicle 10 in a released position of the accelerator pedal (with the operation amount θacc of the accelerator pedal being zero or substantially zero), and is a shift-down action which is required during deceleration of the vehicle 10 in the released position of the accelerator pedal. It is noted that the step-variable transmission portion 20 is placed in a neutral position (a power transmission cutoff state) when all of the coupling devices CB are placed in the released states.

The step-variable transmission portion 20 is shifted up or down to establish a newly selected one of the four AT gear positions, according to the operation amount θacc of the accelerator pedal and the vehicle running speed V, with a releasing action of one of the coupling devices CB and a concurrent engaging action of another coupling device CB, which concurrent releasing and engaging actions are controlled by the above-indicated electronic control device 80. The above-indicated one coupling device CB is a releasing-side coupling device to be placed in its released state to establish the newly selected AT gear position, while the above-indicated another coupling device CB is an engaging-side coupling device to be placed in its engaged state to establish the newly selected AT gear position. Thus, the step-variable transmission portion 20 is shifted up or down from one of the AT gear positions to another by so-called "clutch-to-clutch" shifting operation, namely, concurrent releasing and engaging actions of the selected two coupling devices CB. For instance, the step-variable transmission portion 20 is shifted down from the third speed AT gear position "$3^{rd}$" to the second speed AT gear position "$2^{nd}$", with the releasing action of the clutch C2 serving as the releasing-side coupling device and the concurrent engaging action of the brake B1 serving as the engaging-side coupling device, as indicated in the table of FIG. 2. In this respect, it is noted that the second speed AT gear position "$2^{nd}$" is established in the engaged states of the clutch C1 and the brake B1, while the brake B1 is placed in the released state in the third speed AT gear position "$3^{rd}$", so that the brake B1 is brought into the engaged state to shift down the step-variable transmission portion 20 from the third speed AT gear position "$3^{rd}$" to the second speed AT gear position "$2^{nd}$". In this instance, the hydraulic pressures applied to the clutch C2 and brake B1 are transiently controlled according to predetermined patterns to bring these clutch C2 and brake B1 into the released and engaged states, respectively.

The collinear chart of FIG. 3 indicates the relationship among rotating speeds of the rotary elements of the continuously variable transmission portion 18 and the step-variable transmission portion 20. In this collinear chart, three vertical lines Y1, Y2 and Y3 corresponding to the respective three rotary elements of the differential mechanism 32 of the continuously variable transmission portion 18 respectively represent a "g" axis representing the rotating speed of the second rotary element RE2 in the form of the sun gear S0, an "e" axis representing the rotating speed of the first rotary element RE1 in the form of the carrier CA0, and an "m" axis representing the rotating speed of the third rotary element RE3 in the form of the ring gear R0 (i.e., the input shaft speed of the step-variable transmission portion 20). Further, four vertical lines Y4, Y5, Y6 and Y7 corresponding to the respective four rotary elements of the step-variable transmission portion 20 respectively represent an axis representing the rotating speed of the fourth rotary element RE4 in the form of the sun gear S2, an axis representing the rotating speed of the fifth rotary element RE5 in the form of the ring gear R1 and the carrier CA2 fixed to each other, namely, the rotating speed of the output shaft 22, an axis representing the rotating speed of the sixth rotary element RE6 in the form of the carrier CA1 and the ring gear R2 fixed to each other, and an axis representing the rotating speed of the seventh rotary element RE7 in the form of the sun gear S1. The distances between the adjacent ones of the vertical lines Y1, Y2 and Y3 are determined by a gear ratio ρ0 of the differential mechanism 32, while the distances between the adjacent ones of the vertical lines Y4-Y7 are determined by gear ratios ρ1 and ρ2 of the respective first and second planetary gear sets 36 and 38. Where the distance between the axis representing the rotating speed of the sun gear S0, S1, S2 and the axis representing the rotating speed of the carrier CA0, CA1, CA2 corresponds to "1", the distance between the axis representing the rotating speed of the carrier CA0, CA1, CA2 and the axis representing the rotating speed of the ring gear R0, R1, R2 corresponds to the gear ratio ρ of the planetary gear set (=number of teeth Zs of the sun gear/number of teeth Zr of the ring gear).

Referring to the collinear chart of FIG. 3, the differential mechanism 32 of the continuously variable transmission portion 18 is arranged such that the engine 14 (represented as "ENG" in the collinear chart) is operatively connected to the first rotary element RE1 in a power transmittable manner, and the first electric motor MG1 (represented as "MG1" in the collinear chart) is operatively connected to the second rotary element RE2 in a power transmittable manner, while the second electric motor MG2 (represented as "MG2" in the collinear chart) is operatively connected in a power transmittable manner to the third rotary element RE3 which is rotated together with the intermediate power transmitting member 30. Thus, a rotary motion of the engine 14 is transmitted to the step-variable transmission portion 20 through the intermediate power transmitting member 30. In a part of the collinear chart corresponding to the continuously variable transmission portion 18, straight lines L0 and L0R intersecting the vertical line Y2 represent a relationship between the rotating speeds of the sun gear S0 and the ring gear R0.

The step-variable transmission portion 20 is arranged such that the fourth rotary element RE4 is selectively connected to the intermediate power transmitting member 30 through the clutch C1, the fifth rotary element RE5 is connected to the output shaft 22, the sixth rotary element RE6 is selectively connected to the intermediate power transmitting member 30 through the clutch C2 and is selectively connected to the casing 16 through the brake B2; and the seventh rotary element RE7 is selectively connected to the casing 16 through the brake B1. In a part of the collinear chart corresponding to the step-variable transmission portion 20, straight lines L1, L2, L3, L4 and LR intersecting the vertical line Y5 represent the rotating speeds of the output shaft 22 in the respective first, second, third, fourth speed and reverse drive AT gear positions "$1^{st}$", "$2^{nd}$", "$3^{rd}$", "$4^{th}$" and "Rev" that are selectively established with selective engaging and releasing actions of the coupling devices CB.

Solid straight lines L0, L1, L2, L3 and L4 shown in the collinear chart of FIG. 3 indicate the relative rotating speeds of the rotary elements in a hybrid drive mode in which the vehicle 10 is driven in the forward direction with at least the engine 14 being operated as a drive power source. In the differential mechanism 32 and in the hybrid drive mode, when a torque Te of the engine 14 (engine torque Te) is applied to the carrier CA0 while a reaction torque which is a negative torque generated by the first electric motor MG1 operated in the positive direction is applied to the sun gear S0, a directly transmitted engine torque Td ($=Te/(1+\rho)=-(1/\rho)*Tg$) which is a positive torque is applied to the ring gear R0, whereby the ring gear R0 is rotated in the positive direction with the engine torque Td. The vehicle 10 is driven in the forward direction with a vehicle drive torque (input shaft torque Ti) which is a sum of the directly transmitted engine torque Td and the MG2 torque Tm and which is transmitted to the drive wheels 28 through the step-variable transmission portion 20 selectively placed in one of the first through fourth speed AT gear positions according to a required vehicle drive force. At this time, the first electric motor MG1 functions as an electric generator operated in the positive direction, and generates a negative torque. An electric power Wg generated by the first electric motor MG1 is stored in the battery 52 or consumed by the second electric motor MG2. The second electric motor MG2 is operated to generate the MG2 torque Tm, with all or a part of the electric power Wg generated by the first electric motor MG1, or a sum of the generated electric power Wg and the electric power supplied from the battery 52.

In the differential mechanism 32 and in a motor drive mode in which the vehicle 10 is driven with a drive force generated by the second electric motor MG2 operated as a drive power source while the engine 14 is held at rest, the carrier CA0 is held stationary while the MG2 torque Tm which is a positive torque is applied to the ring gear R0, whereby the ring gear R0 is rotated in the positive direction with the MG2 torque Tm. In this motor drive mode, the state of the differential mechanism 32 is not shown in the collinear chart of FIG. 3. At this time, the first electric motor MG1 connected to the sun gear S0 is placed in a non-load state and freely operated in the negative direction. Namely, in the motor drive mode, the engine 14 is held in a non-operated state, so that an operating speed we of the engine 14 (engine speed we) is kept zero, and the vehicle 10 is driven in the forward direction with the MG2 torque Tm (positive forward driving torque), which is transmitted as a forward drive torque to the drive wheels 28 through the step-variable transmission portion 20 placed in one of the first through fourth speed AT gear positions.

Broken straight lines L0R and LR indicated in FIG. 3 indicate relative rotating speeds of the rotary elements during a reverse running of the vehicle 10 in the motor drive mode. When the vehicle 10 is driven in the rearward direction in this motor drive mode, the MG2 torque Tm which is a negative torque is applied to the ring gear R0, and rotates the ring gear R0 in the negative direction, and is transmitted as a rear drive torque of the vehicle 10 to the drive wheels 28 through the step-variable transmission portion 20 placed in the first speed AT gear position. As described below, the electronic control device 80 controls the second motor/generator MG2 to permit the vehicle 10 to be driven in the rearward direction with the MG2 torque Tm generated while the step-variable transmission portion 20 is placed in the forward-drive low-speed gear position in the form of the first speed AT gear position which is one of the first through fourth speed AT gear positions. The above-indicated MG2 torque Tm is a reverse drive torque Tm of the second electric motor MG2 (a negative torque generated with an operation of the second electric motor MG2 in the negative direction, which is specifically referred to as "MG2 torque TmR") which is opposite in the direction of its transmission to a forward drive torque Tm of the second electric motor MG2 (a positive torque generated with an operation of the second motor/generator MG2 in the positive direction, which is specifically referred to as "MG2 torque TmF"). Thus, the vehicle 10 to be controlled by the electronic control device 80 is driven in the rearward direction by operating the second electric motor MG2 in the negative direction to generate the negative torque Tm while the step-variable transmission portion 20 is placed in the forward-drive AT gear position (which is also used to drive the vehicle 10 in the forward direction). Namely, when the vehicle 10 is driven in the rearward direction, the step-variable transmission portion 20 does not have a reverse drive AT gear position in which the rotational direction of the output rotary member is reversed with respect to the rotational direction of the input rotary member. It is noted that the vehicle 10 can be driven in the rearward direction in the hybrid drive mode as well as in the motor drive mode, since the second motor/generator MG2 can be operated in the negative direction, as indicated by the straight line L0R.

In the vehicular drive system 12, the continuously variable transmission portion 18 functions as an electrically controlled shifting mechanism (electrically controlled differential mechanism) provided with the differential mechanism 32 the differential state of which is controlled by controlling the operating state of the first electric motor MG1 provided as the differential electric motor, and which has the three rotary elements, that is, the first rotary element RE1 in the form of the carrier CA0 to which the engine 14 is operatively connected in a power transmittable manner, the second rotary element RE2 in the form of the sun gear S0 to which the first electric motor MG1 is operatively connected in a power transmittable manner, and the third rotary element RE3 in the form of the ring gear R0 to which the intermediate power transmitting member 30 is connected (in other words, to which the second electric motor MG2 provided as the vehicle driving electric motor is operatively connected) in a power transmittable manner. Namely, the continuously variable transmission portion 18 has the differential mechanism 32 to which the engine 14 is operatively connected in a power transmittable manner, and the first electric motor MG1 to which the differential mechanism 32 is operatively connected in a power transmittable manner, and the operating state of which is controlled to control the differential state of the differential mechanism 32. The continuously variable transmission portion 18 is operated as an electrically controlled continuously variable transmission a speed ratio $\gamma 0$ ($=\omega e/\omega m$) of which is variable. The speed ratio is a ratio of rotating speed of the connecting shaft 34 (namely, engine speed $\omega e$) to the rotating speed of the intermediate power transmitting member 30 (namely, MG2 speed $\omega m$).

In the hybrid drive mode, for instance, the rotating speed of the sun gear S0 is raised or lowered by controlling an operating speed of the first electric motor MG1 while the rotating speed of the ring gear R0 is determined by rotating speed of the drive wheels 28 with the step-variable transmission portion 20 placed in one of the AT gear positions, so that the rotating speed of the carrier CA0 (namely, engine speed $\omega e$) is accordingly raised or lowered. For running of the vehicle 10 with an operation of the engine 14, therefore, the engine 14 can be operated at an efficient operating point.

That is, the step-variable transmission portion 20 to be placed in a selected one of the AT gear positions and the continuously variable transmission portion 18 functioning as a continuously variable transmission cooperate to provide the transmission device 40 which functions as a continuously variable transmission as a whole.

Alternatively, the continuously variable transmission portion 18 can be shifted like a step-variable transmission. Accordingly, the transmission device 40 constituted by the step-variable transmission portion 20 to be placed in one of the AT gear positions and the continuously variable transmission portion 18 which can be shifted like the step-variable transmission can be shifted like a step-variable transmission as a whole. That is, the step-variable transmission portion 20 and the continuously variable transmission portion 18 can be controlled to selectively establish a plurality of speed positions (hereinafter referred to as "overall speed positions" or "conceptual speed positions") having respective different values of a speed ratio $\gamma t$ (=$\omega e/\omega o$) which is a ratio of the engine speed $\omega e$ to the output shaft speed $\omega o$. The speed ratio $\gamma t$ is an overall speed ratio of the transmission device 40 consisting of the continuously variable transmission portion 18 and the step-variable transmission portion 20 which are disposed in series with each other. The overall speed ratio $\gamma t$ is equal to a product of the speed ratio $\gamma 0$ of the continuously variable transmission portion 18 and the speed ratio $\gamma t$ of the step-variable transmission portion 20, namely, $\gamma t = \gamma 0 * \gamma at$.

Figures 4, 5:
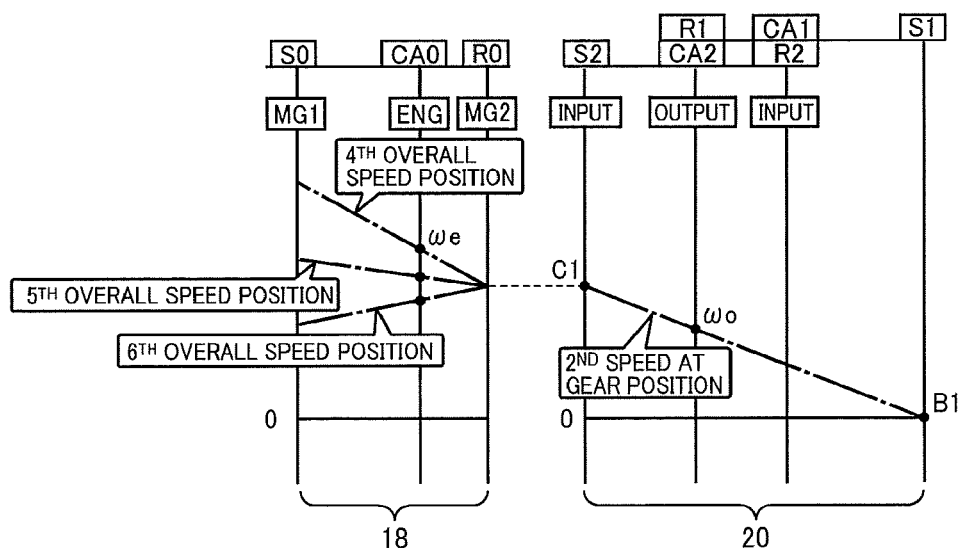
FIG. 4 is a table indicating an example of a plurality of overall speed positions of a transmission device in relation to the gear positions of the step-variable transmission portion.
FIG. 5 is a view indicating the fourth through sixth overall speed positions of the transmission device in which the second speed gear position of the step-variable transmission portion is established, on a collinear chart similar to that of FIG. 3.

At least one overall speed position is provided for each of the four AT gear positions of the step-variable transmission portion 20, with a combination of each AT gear position with at least one of the different speed ratio values $\gamma 0$ of the continuously variable transmission portion 18. FIG. 4 is the table indicating an example of the overall speed positions of the transmission device 40, wherein first through third overall speed positions are established for the first speed AT gear position, fourth through sixth overall speed positions are established for the second speed AT gear position, seventh through ninth overall speed positions are established for the third speed AT gear position, and a tenth overall speed position is established for the fourth speed AT gear position. FIG. 5 is the view indicating the fourth through sixth overall speed positions of the transmission device 40 in which the second speed AT gear position of the step-variable transmission portion 20 is achieved, on a collinear chart similar to that of FIG. 3. In the transmission device 40, the continuously variable transmission portion 18 is controlled to control the engine speed we with respect to the output shaft speed $\omega$ for establishing the predetermined overall speed ratio values $\gamma t$, to thereby establish each of the overall speed positions.

Referring back to FIG. 1, the vehicle 10 is provided with the shift control apparatus in the form of the electronic control device 80 configured to control various devices of the vehicle 10 such as the engine 14, continuously variable transmission portion 18 and step-variable transmission portion 20. FIG. 1 is the view showing input and output signals of the electronic control device 80, and is a functional block diagram showing major control functions and control portions of the electronic control device 80. For example, the electronic control device 80 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control device 80 may be constituted by two or more control units exclusively assigned to perform different control operations such as engine control operations and transmission shifting control operations.

The electronic control device 80 receives various input signals such as: an output signal of an engine speed sensor 60 indicative of the engine speed $\omega e$; an output signal of an MG1 speed sensor 62 indicative of the MG1 speed $\omega g$ which is the operating speed of the first electric motor MG1; an output signal of an MG2 speed sensor 64 indicative of the MG2 speed $\omega m$ which is the AT input shaft speed $\omega i$; an output signal of an output shaft speed sensor 66 indicative of the output shaft speed $\omega o$ corresponding to the vehicle running speed V; an output signal of an accelerator pedal operation amount sensor 68 indicative of the operation amount $\theta acc$ of the accelerator pedal, which operation amount $\theta acc$ represents a degree of acceleration of the vehicle 10 required by a vehicle operator; an output signal of a throttle valve opening angle sensor 70 indicative of an angle $\theta th$ of opening of an electronic throttle valve; an output signal of an acceleration sensor 72 indicative of a longitudinal acceleration value G of the vehicle 10; an output signal of a shift position sensor 74 indicative of a presently selected operating position POSsh of a manually operated shifting member in the form of a shift lever 56 provided in the vehicle 10; output signals of a battery sensor 76 indicative of a temperature THbat, a charging/discharging electric current that and a voltage Vbat of the battery 52; and an output signal of an oil temperature sensor 78 indicative of a temperature Toil of a working fluid in the step-variable transmission portion 20.

Further, the electronic control device 80 generates various output signals such as: an engine control command signal Se to be applied to an engine control device 58 provided to control a throttle actuator, a fuel injecting device and an ignition device, for controlling the engine 14; electric motor control command signals Smg to be applied to the inverter 50, for controlling the first electric motor MG1 and the second electric motor MG2; and hydraulic control command signals Sat to be applied to the hydraulic control unit 54, for controlling the operating states of the coupling devices CB (namely, for controlling the shifting actions of the step-variable transmission portion 20). The hydraulic control command signals Sat are command signals (drive currents) to be applied to the hydraulic control unit 54 for controlling amounts of electric currents to be applied to the solenoid-operated valves SL1-SL4 which regulate the hydraulic pressure Pcb to be applied to each of the hydraulic actuators of the coupling devices CB. The electronic control device 80 operates to set a hydraulic pressure command value (command pressure value) corresponding to the hydraulic pressure Pcb to be applied to each of the hydraulic actuators, and outputs a drive current corresponding to the hydraulic pressure command value.

The presently selected operating position POSsh of the shift lever 56 is one of: a parking position P; a reverse drive position R; a neutral position N; and a forward drive position D, for example. The parking position P is a position which is established while the transmission device 40 is placed in a neutral state (in which the step-variable transmission portion 20 is placed in a non-power transmittable state with all of the coupling devices CB placed in their released state) and in which the output shaft 22 is mechanically locked to prevent its rotary motion, for thereby holding the transmission device 40 in a parking brake position. The reverse drive position R is a position in which the transmission device 40 is placed in a rear drive state in which the vehicle 10 can be driven in the rearward direction with the MG2 torque TmR while the step-variable transmission portion 20 is placed in the first speed AT gear position. The neutral position N is a position in which the transmission device 40 is placed in the above-indicated neutral state. The forward drive position D is a position in which the transmission device 40 is placed in a forward drive state in which the vehicle 10 can be driven in the forward direction according to an automatic shifting control to selectively establish one of all of the first through fourth speed AT gear positions (one of all of the first through tenth overall speed positions). Therefore, when the shift lever 56 is switched from the forward drive position D to the rear drive position R, the transmission device 40 is commanded to be switched from its forward drive state to the rear drive state, (namely, to perform a switching action from the forward drive state to the rear drive state). Thus, the manually operated shift lever 56 functions as a manually operated member for commanding the transmission device 40 in a selected one of its operating states describe above.

The electronic control device 80 is configured to calculate a charging state (stored electric power amount) SOC of the battery 52 on the basis of the charging/discharging electric current Ibat and the voltage Vbat of the battery 52. The electronic control device 80 is further configured to calculate, on the basis of, for example, the temperature THbat and the charging state SOC of the battery 52, a maximum charging amount Win of electric power that can be stored in the battery 52, and a maximum discharging amount Wout of electric power that can be discharged from the battery 52, which maximum charging and discharging amounts Win and Wout define a range of an electric power of the battery 52 that can be used. The calculated maximum charging and discharging amounts Win and Wout decrease with a decrease of the battery temperature THbat when the battery temperature THbat is lower than a normal level, and decrease with an increase of the battery temperature THbat when the battery temperature THbat is higher than the normal level. Further, the maximum charging amount Win decreases with an increase of the stored electric power amount SOC when the stored electric power amount SOC is relatively large. The maximum discharging amount Wout decreases with a decrease of the stored electric power amount SOC when the stored electric power amount SOC is relatively small.

To implement various controls of the vehicle 10, the electronic control device 80 includes a transmission shifting control portion 82 (transmission shifting control means), a hybrid control portion 84 (hybrid control means), a shift control mode determining portion 90 (shift control mode determining means) and a drive state determining portion 92 (drive state determining means). The transmission shifting control portion 82 includes a first shift control portion 86 (first shift control means) and a second shift control portion 88 (second shift control means). It is noted that the transmission shifting control portion 82, the first shift control portion 86, and the second shift control portion 88 correspond to a shift control portion of the shift control apparatus according to the present invention.

The transmission shifting control portion 82 is configured to determine a shifting action of the step-variable transmission portion 20 according to a memory-stored AT gear position shifting map obtained by experimentation or determined by an appropriate design theory, and applies the hydraulic control command signals Sat to the hydraulic control unit 54, for commanding the solenoid-operated valves SL1-SL4 to bring the appropriate ones of the coupling devices CB into the released and engaged states, for automatically shifting up or down the step-variable transmission portion 20. The AT gear position shifting map indicated above is a predetermined relationship between two variables in the form of the output shaft speed $\omega o$ (equivalent to the vehicle running speed V) and the accelerator pedal operation amount $\theta acc$ (equivalent to a required drive torque Tdem and the throttle valve opening angle $\theta th$), which relationship is used to determine a shifting action of the step-variable transmission portion 20 and is represented by shift-up and shift-down shifting lines in a two-dimensional coordinate system in which the output shaft speed $\omega o$ and the accelerator pedal operation amount $\theta acc$ are taken along respective two axes.

The hybrid control portion 84 has a function of an engine control means or portion to control the engine 14, and a function of an electric motor control means or portion to control the first electric motor MG1 and the second electric motor MG2 through the inverter 50. Thus, the hybrid control portion 84 performs hybrid drive controls for controlling the engine 14, first electric motor MG1 and second electric motor MG2. The hybrid control portion 84 is configured to calculate a required vehicle drive power Pdem on the basis of the accelerator pedal operation amount $\theta acc$ and the vehicle running speed V, and according to a predetermined relationship in the form of a drive force map, for instance. In other words, the hybrid control portion 84 calculates the required drive torque Tdem at the present vehicle running speed V. The hybrid control portion 84 generates the engine control command signal Se to control the engine 14, and the electric motor control command signals Smg to control the first electric motor MG1 and the second electric motor MG2, for establishing the required vehicle drive power Pdem, while taking account of the maximum charging and discharging amounts Win and Wout of electric power of the battery 52. For example, the engine control command signal Se represents a command value of a power Pe of the engine 14 generating the torque Te at its present operating speed $\omega e$. For example, the electric motor control command signals Smg represent a command value of an electric power amount Wg to be generated by the first electric motor MG1 to generate the reaction torque counteracting the engine torque Te, namely, the MG1 torque Tg at the present MG1 speed $\omega g$, and an electric power amount Wm to be consumed by the second electric motor MG2 to generate the MG2 torque Tm at the present MG2 speed $\omega m$.

When the transmission device 40 as a whole is operated as the continuously variable transmission while the continuously variable transmission portion 18 is operated as the continuously variable transmission, for instance, the hybrid control portion 84 controls the engine 14 and the electric power amount Wg to be generated by the first electric motor MG1, so as to establish the engine speed $\omega e$ and the engine torque Te for obtaining the engine power Pe to establish the required vehicle drive power Pdem, while taking account of a highest fuel economy point of the engine 14, so that the speed ratio $\gamma 0$ of the continuously variable transmission portion 18 is controlled so as to be continuously varied. As a result, the speed ratio $\gamma t$ of the transmission device 40 is controlled while the continuously variable transmission portion 18 is operated as the continuously variable transmission.

When the transmission device 40 as a whole is operated as the step-variable transmission while the continuously variable transmission portion 18 is operated as the step-variable transmission, for instance, the hybrid control portion 84 determines a shifting action of the transmission device 40 according to an overall speed position shifting map, for example, and performs a shifting control of the continuously variable transmission portion 18 to establish a selected one of the plurality of overall speed positions, in cooperation with the transmission shifting control portion 82 to shift the step-variable transmission portion 20 selectively to the AT gear positions. The plurality of overall speed positions can be established by controlling the first electric motor MG1 to control the engine speed ωe according to the output shaft speed ωo so as to maintain the respective speed ratio values γt. It is noted that the speed ratio γt of each of the overall speed positions does not necessarily have to be held constant over an entire range of the output shaft speed ωo, but may be changed in a certain part or parts of the entire range of the output shaft speed ωo or may be given a limitation or limitations, for example, depending on upper and lower limits of rotating speeds of respective rotary elements.

Figure 6:
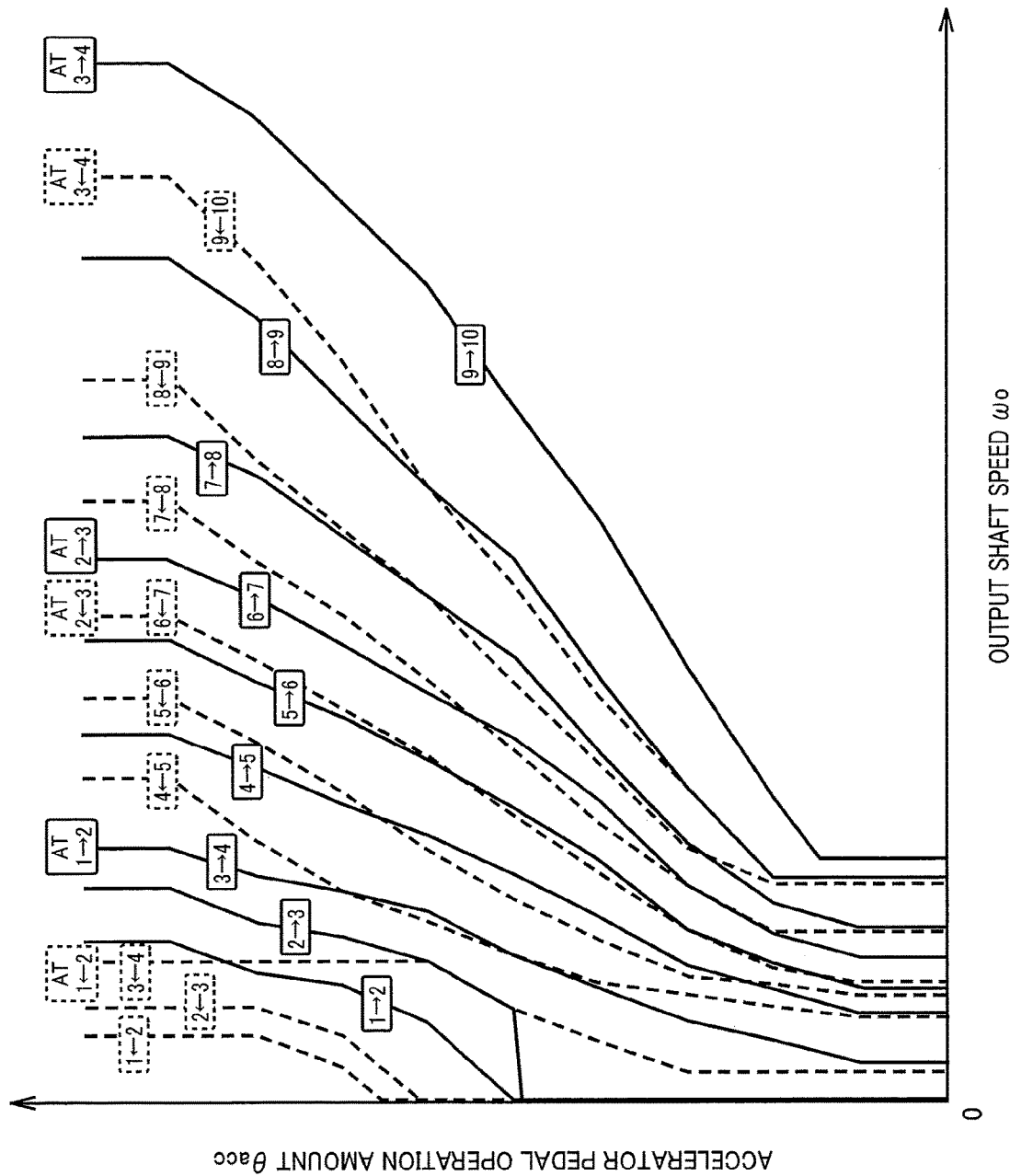
FIG. 6 is a view illustrating an example of an overall speed position shifting map used to shift up and down the transmission device from each of the overall speed positions to the adjacent position or positions.

Like the AT gear position shifting map, the above-indicated overall speed position shifting map is a relationship between the output shaft speed ωo and the accelerator pedal operation amount θacc used as parameters. FIG. 6 is the view illustrating an example of the overall speed position shifting map. In FIG. 6, solid lines indicate shift-up boundary lines while broken lines indicate shift-down boundary lines. The transmission device 40 consisting of the continuously variable transmission portion 18 and the step-variable transmission portion 20 which are disposed in series with each other is shifted from one of the overall speed positions to another according to the overall speed position shifting map, as if the transmission device 40 was shifted like a step-variable transmission as a whole. This overall step-variable shifting control to control the shifting actions of the transmission device 40 as the step-variable transmission as a whole may be implemented preferentially to the continuously variable shifting control of the transmission device 40 as the continuously variable transmission as a whole, only when a sporty drive mode or any other high-drivability drive mode is selected by the vehicle operator, or only when the required drive torque Tdem is comparatively large, but may be principally implemented except where the overall step-variable shifting control is restricted or inhibited.

The overall step-variable shifting control by the hybrid control portion 84 and the shifting control of the step-variable transmission portion 20 by the transmission shifting control portion 82 are implemented in cooperation with each other. In this embodiment, the first through tenth overall speed positions are established for the first through fourth speed AT gear positions. When the transmission device 40 is shifted between the fourth overall speed position and the third overall speed position, for example, the step-variable transmission portion 20 is shifted between the second speed AT gear position and the first speed AT gear position. When the transmission device 40 is shifted between the seventh overall speed position and the sixth overall speed position, the step-variable transmission portion 20 is shifted between the third speed AT gear position and the second speed AT gear position. When the transmission device 40 is shifted between the tenth overall speed position and the ninth overall speed position, the step-variable transmission portion 20 is shifted between the fourth speed AT gear position and the third speed AT gear position. Therefore, the AT gear position shifting map is formulated so that the AT gear position shifting operation is performed in synchronization with the overall speed position shifting operation. Described more specifically by reference to FIG. 6, shift-up boundary lines for respectively shifting the transmission device 40 from the third overall speed position to the fourth overall speed position, from the sixth overall speed position to the seventh overall speed position, and from the ninth overall speed position to the tenth overall speed position coincide with shift-up boundary lines for respectively shifting the step-variable transmission portion 20 from the first speed AT gear position to the second speed AT gear position (indicated as "AT1→2" in FIG. 6), from the second speed AT gear position to the third speed AT gear position, and from the third speed AT gear position to the fourth speed AT gear position. Similarly, shift-down boundary lines for respectively shifting the transmission device 40 from the fourth overall speed position to the third overall speed position, from the seventh overall speed position to the sixth overall speed position, and from the tenth overall speed position to the ninth overall speed position coincide with shift-down boundary lines for respectively shifting the step-variable transmission portion 20 from the second speed AT gear position to the first speed AT gear position (indicated as "AT1←2" in FIG. 6), from the third speed AT gear position to the second speed AT gear position, and from the fourth speed AT gear position to the third speed AT gear position. Alternatively, a command to shift the step-variable transmission portion 20 may be applied to the transmission shifting control portion 82 in response to a determination according to the overall speed position shifting map of FIG. 6 that the transmission device 40 should be shifted from one overall speed position to another. Thus, the transmission shifting control portion 82 commands the step-variable transmission portion 20 to perform a shifting action from one AT gear position to another, for shifting the transmission device 40 from one overall speed position to another. Since the AT gear position shifting operation is performed in synchronization with the overall speed position shifting operation, the shifting action of the step-variable transmission portion 20 is performed with a change of the engine speed we, so that the vehicle operator is less likely to uncomfortably recognize a shifting shock of the step-variable transmission portion 20.

The hybrid control portion 84 selectively establishes the motor drive mode or the hybrid drive mode, depending upon a running state of the vehicle 10. For example, the hybrid control portion 84 selects the motor drive mode when the required vehicle drive power Pdem is lower than a predetermined threshold value, that is, within a predetermined motor drive mode range, and selects the hybrid drive mode when the required vehicle drive power Pdem is equal to or higher than the threshold value, that is, within a predetermined hybrid drive mode range. Further, even when the required vehicle drive power Pdem is within the motor drive mode range, the hybrid control portion 84 selects the hybrid drive mode if the electric power amount SOC stored in the battery 52 is smaller than a predetermined threshold value.

When a determination of requirement for a shift-down action of the step-variable transmission portion 20 is made in the non-driving state of the vehicle 10, the shift-down action is implemented in a predetermined non-vehicle-driving mode of hydraulic control. Here, it is noted that the vehicle 10 is switched from its non-driving state to its driving state, in the process of the shift-down action of the step-variable transmission portion 20. It is considered possible to implement the shift-down action again with the mode of hydraulic control of the step-variable transmission portion 20 switched from the non-vehicle-driving mode to a predetermined vehicle-driving mode, for example, if the vehicle 10 is switched from the non-driving state to the driving state during the shift-down action. This switching of the mode of hydraulic control permits the shift-down action to be implemented according to a specific running state of the vehicle 10, and reduction of a shifting shock of the step-variable transmission portion 20. However, the switching of the mode of hydraulic control gives rise to a loss of a power balance among an engine power, a vehicle drive power transmitted through the engaging-side and releasing-side coupling devices CB, an electric power of the battery 52 (maximum charging and discharging amounts Win and Wout) and an inertial power (speed variation power) of the step-variable transmission portion 20, and consequent generation of a shifting shock of the step-variable transmission portion 20 depending on the degree of progress in the shift-down action on the switching. In addition, where the electric power of the battery 52 is limited during the shift-down action, for instance, the maximum charging and discharging amounts Win and Wout of electric power of the battery 52 are limited, and the loss of the power balance is further aggravated.

To reduce the above-described risk, the transmission shifting control portion 82 includes the first and second shift control portions 86 and 88 configured to control the shift-down action of the step-variable transmission portion 20 when the vehicle 10 is switched from its non-driving state to its driving state during the shift-down action in the non-driving state of the vehicle 10, so that the hydraulic control of the step-variable transmission portion 20 is implemented under the control of one of the first and second shift control portions 86 and 88, which is selected according to the running state of the vehicle 10, to implement the shift-down action in the corresponding one of the non-vehicle-driving and vehicle-driving control modes, so as to reduce the shifting shock of the step-variable transmission portion 20. There will be described the hydraulic controls of the step-variable transmission portion 20 implemented by the first and second shift control portions 86 and 88.

The first shift control portion 86 switches the mode of hydraulic control of the step-variable transmission portion 20 from the non-vehicle-driving control mode to the vehicle-driving control mode where the vehicle 10 is switched from its non-driving state to its driving state during the shift-down action of the step-variable transmission portion 20 in the non-driving state of the vehicle 10. On the other hand, the second shift control portion 88 maintains the non-vehicle-driving control mode where the vehicle 10 is switched from the non-driving state to the driving state during the shift-down action of the step-variable transmission portion 20 in the non-driving state of the vehicle 10, and limits the input shaft torque Ti of the step-variable transmission portion 20 to a predetermined value Tα in the non-vehicle-driving control mode. In this respect, it is noted that the driving state of the vehicle 10 is a state in which a forward drive torque (input shaft torque Ti) acting in the forward direction of the vehicle 10 is transmitted from the drive power source portion 39 to the step-variable transmission portion 20, and that the non-driving state of the vehicle 10 is a state in which the forward drive torque is not transmitted from the drive power source portion 39 to the step-variable transmission portion 20, while a reverse drive torque acting in the backward direction of the vehicle 10 is transmitted from the drive wheels 28 to the step-variable transmission portion 20.

The electronic control device 80 includes a shift control mode determining portion 90 configured to select one of the first and second shift control portions 86 and 88 which should be operated to control the shift-down action of the step-variable transmission portion 20 in a corresponding one of the vehicle-driving control mode and the non-vehicle-driving control mode when the vehicle 10 is switched from the non-driving state to the driving state during the shift-down action. The shift control mode determining portion 90 measures a length of time t which has passed after a moment of initiation of the shift-down action (a moment of determination of requirement for the shift-down action), and determines whether or not the length of time t measured at a point of time when the vehicle 10 is switched from the non-driving state to the driving state is equal to or longer than a predetermined value tα. If the measured length of time t is shorter than the predetermined value tα, the shift control mode determining portion 90 selects the first shift control portion 86 to control the step-variable transmission portion 20 in the vehicle-driving control mode during its shift-down action. If the measured length of time t is equal to or longer than the predetermined value tα, the shift control mode determining portion 90 selects the second shift control portion 88 to control the step-variable transmission portion 20 in the non-vehicle-driving control mode during its shift-down action. The electronic control device 80 further includes the drive state determining portion 92 configured to determine whether the vehicle 10 has been switched from the non-driving state to the driving state. The drive state determining portion 92 estimates the input shaft torque Ti of the step-variable transmission portion 20 on the basis of the accelerator pedal operation amount θacc (or the throttle valve opening angle θth), and the running speed V of the vehicle 10, and determines that the vehicle 10 has been switched from the non-driving state to the driving state, when the estimated input shaft torque Ti has become larger than zero.

The predetermined length of time tα is obtained by experimentation or calculation, such that the vehicle operator does not feel a discomfort about a shifting shock of the step-variable transmission portion 20 even if the shift-down action is controlled in the vehicle-driving control mode under the control of the first shift control portion 86 where the vehicle 10 is switched from the non-driving state to the driving state within the predetermined length of time tα. It is noted that the shifting shock is determined by the longitudinal acceleration value G of the vehicle. Accordingly, it is considered that the vehicle operator feels a discomfort about the shifting shock if the longitudinal acceleration value G is higher than a predetermined value. That is, the predetermined value is an upper limit of the longitudinal acceleration value G above which the vehicle operator feels a discomfort about the shifting shock.

Described more specifically, the predetermined length of time tα is set such that the predetermined length of time expires at latest before the moment of initiation of the inertia phase of the shift-down action of the step-variable transmission portion 20, for example, during the torque phase of the shift-down action. After the moment of initiation of the inertia phase, the hydraulic pressure Pcb (engaging torque Tcb) of the engaging-side coupling device CB to be brought into its engaged state to implement the shift-down action has been sufficiently raised (increased), and the control of the shift-down action in the non-vehicle-driving control mode has considerably progressed. If the mode of hydraulic control of the engaging-side coupling device CB is switched from the non-vehicle-driving control mode to the vehicle-driving control mode after the moment of initiation of the inertia phase, it takes a long time to restore the engaging-side coupling device CB to an initial state of the shift-down action, so that a shifting response of the engaging-side coupling device CB is deteriorated. In addition, there is a risk of overshooting of the input shaft speed ωi and generation of a shifting shock of the step-variable transmission portion 20 upon reduction of the transmitted torque (torque capacity) of the step-variable transmission portion 20 in the process of switching of the mode of hydraulic control of the engaging-side coupling device CB. In other words, there is a risk of an abrupt change of the inertial power, and a loss of power balance and consequent generation of the shifting shock. To prevent this risk, the predetermined length of time to is set to expire at latest before the moment of initiation of the inertia phase of the shift-down action of the step-variable transmission portion 20. It is noted that the predetermined length of time tα may be set as needed, so as to vary according to the oil temperature Toil, the presently selected AT gear position, etc.

There will be described the control of the shift-down action (coasting shift-down action) of the step-variable transmission portion 20 to the lower-speed AT gear position, which is implemented where the vehicle 10 is switched from the non-driving state to the driving state during the shift-down action. First, there will be described the control of the shift-down action implemented by the first shift control portion 86 where the vehicle 10 is switched from the non-driving state to the driving state during the shift-down action under the control of the transmission shifting control portion 82. For example, the coasting shift-down action of the step-variable transmission portion 20 from the third speed AT gear position to the second speed AT gear position in a coasting run of the vehicle 10 is implemented with a releasing action of the clutch C2 and an engaging action of the brake B1. In this case, the clutch C2 is the releasing-side coupling device CB, while the brake B1 is the engaging-side coupling device CB.

When the transmission shifting control portion 82 makes a determination of requirement for the shift-down action of the step-variable transmission portion 20 in the non-driving state of the vehicle 10, the step-variable transmission portion 20 is hydraulically controlled in the non-vehicle-driving control mode. In this non-vehicle-driving control mode, the hydraulic pressure Pcb (releasing hydraulic pressure Pcbre) of the releasing-side coupling device CB (clutch C2 in the case of the shift-down action from the third speed AT gear position to the second speed AT gear position) is lowered, while the hydraulic pressure Pcb (engaging hydraulic pressure Pcbap) of the engaging-side coupling device CB (brake B1 in the case of the shift-down action from the third speed AT gear position to the second speed AT gear position) is controlled to be a predetermined command value, so that the shift-down action progresses. Namely, in the non-vehicle-driving control mode, the engaging hydraulic pressure Pcbap (engaging torque Tcbap) of the engaging-side coupling device CB is primarily controlled to permit the shift-down action to adequately progress.

When the vehicle 10 is switched from the non-driving state to the driving state during the shift-down action of the step-variable transmission portion 20, the step-variable transmission portion 20 is controlled by the first shift control portion 86. That is, the first shift control portion 86 switches the mode of hydraulic control of the step-variable transmission portion 20 from the non-vehicle-driving control mode to the vehicle-driving control mode. Described more specifically, the first shift control portion 86 is configured to primarily control the releasing hydraulic pressure Pcbre of the releasing-side coupling device CB (clutch C2 in the case of the shift-down action from the third speed AT gear position to the second speed AT gear position) to permit the shift-down action to adequately progress. In the driving state of the vehicle 10, the input shaft torque Ti is transmitted to the step-variable transmission portion 20, and the input shaft speed ωi is raised with the input shaft torque Ti toward the post-shift-down synchronizing speed ωisyc. However, the first shift control portion 86 controls the releasing hydraulic pressure Pcbre (engaging torque Tcbre) of the releasing-side coupling device CB, so as to keep a rate of rise of the input shaft speed ωi at an optimum value, so that the shift-down action can be implemented so as to adequately progress. Thus, the step-variable transmission portion 20 is adequately hydraulically controlled in the vehicle-driving control mode suitable for the driving state of the vehicle 10 even where the vehicle 10 is switched from the non-driving state to the driving state, whereby the shift-down action can be implemented so as to adequately progress without a shifting shock.

Before the vehicle 10 is switched to the driving state, the step-variable transmission portion 20 has been hydraulically controlled in the non-vehicle-driving control mode, so that the releasing hydraulic pressure Pcbre (actual value) of the releasing-side coupling device CB has been lowered when the vehicle 10 has been switched to the driving state, whereby it is difficult to control the input shaft speed ωi by controlling the releasing hydraulic pressure Pcbre of the releasing-side coupling device CB. The first shift control portion 86 restores the releasing-side coupling device CB to its initial state by temporarily raising the releasing hydraulic pressure Pcbre (command value) to a predetermined value P1, in connection with switching to the vehicle-driving control mode from the non-vehicle-driving control mode due to switching of the vehicle 10 from the non-driving state to the driving state to restart the shift-down action in the vehicle-driving control mode. Accordingly, the shift-down action can be implemented so as to adequately progress by controlling the releasing hydraulic pressure Pcbre of the releasing-side coupling device CB after the vehicle 10 is switched from the non-driving state to the driving state. During the control of the releasing hydraulic pressure Pcbre of the releasing-side coupling device CB, the engaging hydraulic pressure Pcbap of the engaging-side coupling device CB is lowered to a predetermined value (for instance, a hydraulic pressure at which the hydraulic cylinder is substantially filled with the working fluid), and is then kept at that predetermined value.

There will next be described the control of the shift-down action of the step-variable transmission portion 20 implemented by the second shift control portion 88 where the vehicle 10 is switched from the non-driving state to the driving state during the shift-down action under the control of the transmission shifting control portion 82.

When the transmission shifting control portion 82 makes the determination of requirement for the shift-down action of the step-variable transmission portion 20 in the non-driving state of the vehicle 10, the step-variable transmission portion 20 is hydraulically controlled in the non-vehicle-driving control mode. When it is determined that the vehicle 10 has been switched from the non-driving state to the driving state during the shift-down action of the step-variable transmission portion 20, the step-variable transmission portion 20 is controlled by the second shift control portion 88. That is, the second shift control portion 88 maintains the non-vehicle-driving control mode to hydraulically control the step-variable transmission portion 20, and limits the input shaft torque Ti to the predetermined value Tα, so that the shift-down action can be implemented so as to adequately progress.

When the step-variable transmission portion 20 is hydraulically controlled in the non-vehicle-driving mode to implement the shift-down action after the vehicle 10 is switched to the driving state, there is a risk of an abrupt rise and overshooting of the input shaft speed ωi of the step-variable, transmission portion 20, and consequent generation of an engaging shock of the engaging-side coupling device CB (shifting shock of the step-variable transmission portion 20). To reduce this risk, the second shift control portion 88 is configured to limit the input shaft torque Ti of the step-variable transmission portion 20 to the predetermined value Tα after the vehicle 10 has been switched from the non-driving state to the driving state. For example, the second shift control portion 88 commands the hybrid control portion 84 to limit the input shaft torque Ti to the predetermined value Tα, and the hybrid control portion 84 limits the input shaft torque Ti to the predetermined value Tα. Where the maximum charging and discharging amounts Win and Wout of electric power of the battery 52 is limited, the hybrid control portion 84 controls the torque Te of the engine 14 to limit the input shaft torque Ti. After the vehicle 10 has been switched from the non-driving state to the driving state, the second shift control portion 88 controls a rate of change (sweeping rate) of the engaging hydraulic pressure Pcbap to be higher than an ordinary value, so that the shift-down action rapidly progresses.

The predetermined value Tα is obtained by experimentation or calculation, such that the vehicle operator does not feel a discomfort about a shifting shock of the step-variable transmission portion 20 even if the step-variable transmission portion 20 is hydraulically controlled in the non-vehicle-driving control mode. It is noted that the shifting shock is determined by the longitudinal acceleration value G of the vehicle. Accordingly, it is considered that the vehicle operator feels a discomfort about the shifting shock if the longitudinal acceleration value G is higher than a predetermined value. Thus, the input shaft torque Ti is limited to the predetermined value Tα, to reduce the shifting shock even if the non-vehicle-driving control mode is maintained after the vehicle 10 is switched to the driving state. The predetermined value Tα may be set so as to vary according to the length of time t after the moment of switching of the vehicle 10 to the driving state, the presently selected AT gear position, the oil temperature Toil, the maximum charging and discharging amounts Win and Wout of electric power of the battery 52, etc. Since the shifting state of the step-variable transmission portion 20 varies according to the length of time t after the moment of switching of the vehicle 10 to the driving state, the predetermined value Tα is set so as to vary according to the length of time t.

As explained above, the hydraulic control by the second shift control portion 88 is initiated after the moment of initiation of the inertia phase. After the moment of initiation of the inertia phase, the torque capacity Tcbap of the engaging-side coupling device CB has been sufficiently increased, so that there is a risk of generation of a shifting shock of the step-variable transmission portion 20 due to switching of the mode of hydraulic control of the engaging-side coupling device CB to the vehicle-driving control mode after the sufficient rise of the torque capacity Tcbap. There is also a risk of deterioration of the shifting response of the step-variable transmission portion 20 due to the switching of the mode of hydraulic control. There is further a risk of loss of power balance due to a change of the inertial power in the non-vehicle-driving control mode in the driving state of the vehicle 10. However, the second shift control portion 88 limits the input shaft torque Ti to the predetermined value Ta, to reduce the risk of loss of the power balance. Thus, the second shift control portion 88 controls the step-variable transmission portion 20 where the vehicle 10 is switched from the non-driving state to the driving state within the predetermined length of time tα. Accordingly, it is possible to reduce the risks of generation of the shifting shock and deterioration of the shifting response due to switching of the mode of hydraulic control of the step-variable transmission portion 20.

Figure 7:
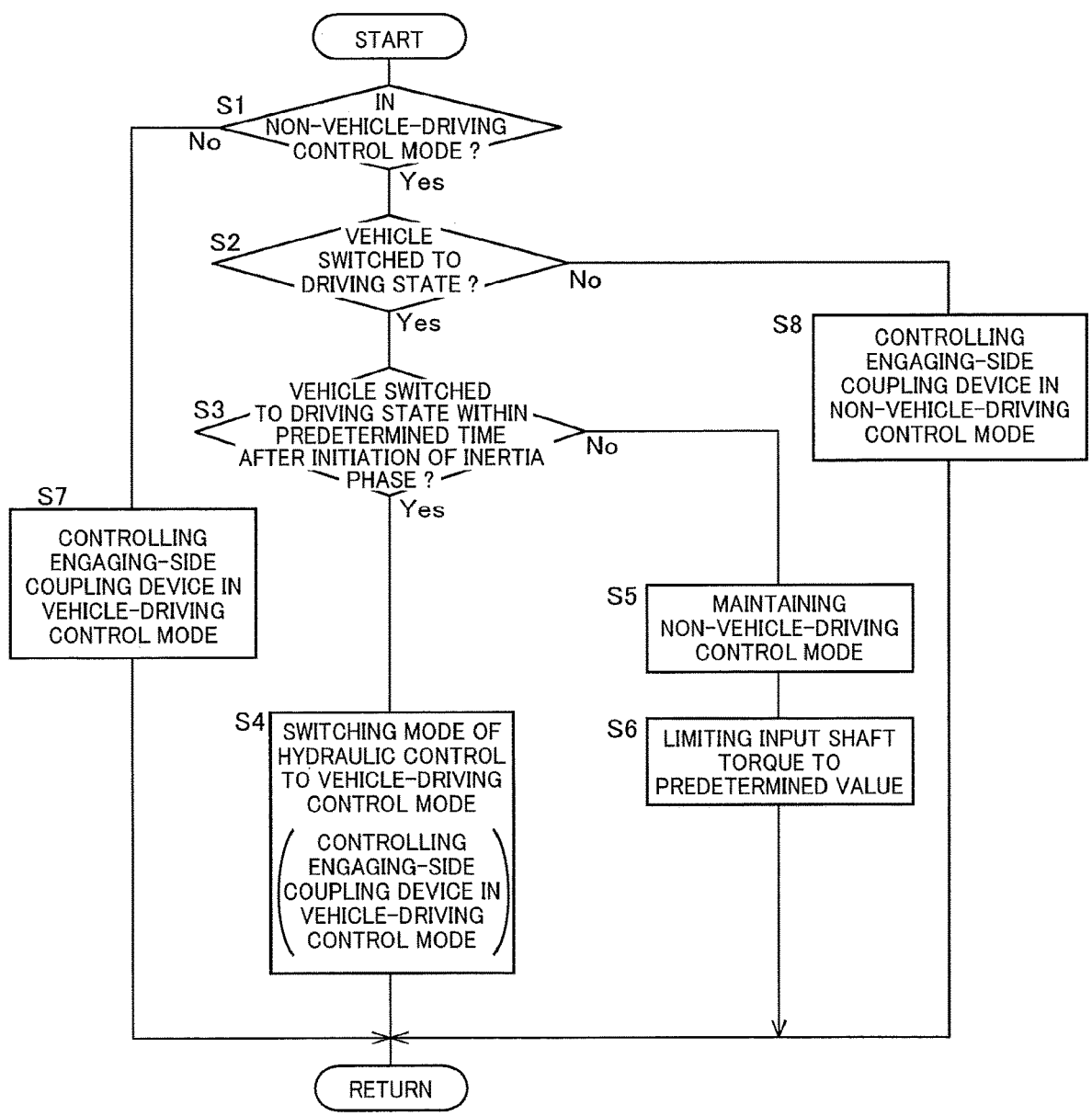
FIG. 7 is a flow chart illustrating an essential part of a control routine executed by an electronic control device, namely, a control operation performed when the vehicle is switched from its non-driving state to its driving state during a shift-down action of the step-variable transmission portion in the non-driving state of the vehicle.

FIG. 7 is the flow chart illustrating an essential part of a control routine executed by the electronic control device 80, namely, a control operation performed when the vehicle 10 is switched from its non-driving state to its driving state during a shift-down action of the step-variable transmission portion 20 in the non-driving state of the vehicle 10. This control routine is repeatedly executed during the shift-down action of the step-variable transmission portion 20.

The control routine of FIG. 7 is initiated with a step S1 corresponding to the function of the transmission shifting control portion 82, to determine whether the step-variable transmission portion 20 is hydraulically controlled during its shift-down action in the non-vehicle-driving control mode. If a negative determination is obtained in the step S1, the control flow goes to a step S7 also corresponding to the function of the transmission shifting control portion 82, to hydraulically control the step-variable transmission portion 20 in the vehicle-driving control mode, namely, to control the releasing hydraulic pressure Pcbre of the releasing-side coupling device CB to permit the shift-down action to adequately progress.

If an affirmative determination is obtained in the step S1, the control flow goes to a step S2 corresponding to the function of the drive state determining portion 92, to determine whether the vehicle 10 has been switched from the non-driving state to the driving state. If a negative determination is obtained in the step S2, the control flow goes to a step S8 also corresponding to the function of the transmission shifting control portion 82, to hydraulically control the step-variable transmission portion 20 in the non-vehicle-driving control mode, namely, to control the engaging hydraulic pressure Pcbap of the engaging-side coupling device CB to permit the shift-down action to adequately progress.

If an affirmative determination is obtained in the step S2, the control flow goes to a step S3 corresponding to the function of the shift control mode determining portion 90, to determine whether the vehicle 10 has been switched to the driving state within the predetermined length of time • tα after the moment of initiation of the shift-down action of the step-variable transmission portion 20. If an affirmative determination is obtained in the step S3, the control flow goes to a step S4 corresponding to the function of the first shift control portion 86, to switch the mode of hydraulic control of the step-variable transmission portion 20 from the non-vehicle-driving control mode to the vehicle-driving control mode, so that the step-variable transmission portion 20 is hydraulically controlled in the vehicle-driving control mode. Thus, the mode of hydraulic control the step-variable transmission portion 20 is switched to the vehicle-driving control mode and the shift-down action is implemented again where the vehicle 10 is switched from the non-driving state to the driving state during the shift-down action within the predetermined length of time to after the moment of initiation of the shift-down action.

If a negative determination is obtained in the step S3, the control flow goes to a step S5 corresponding to the function of the second shift control portion 88, to maintain the non-vehicle-driving control mode. The step S5 is followed by a step S6 also corresponding to the function of the second shift control portion 88, to limit the input shaft torque Ti of the step-variable transmission portion 20 to the predetermined value Tα. It is noted that the steps S5 and S6 are concurrently implemented. Thus, where the vehicle 10 is switched from the non-driving state to the driving state during the shift-down action of the step-variable transmission portion 20 initiated in the non-driving state of the vehicle 10, after the predetermined length of time to after the moment of initiation of the shift-down action, the non-vehicle-driving control mode is maintained, and the input shaft torque Ti is limited to the predetermined value Tα, so that the shift-down action can be implemented so as to adequately progress.

Figure 8:
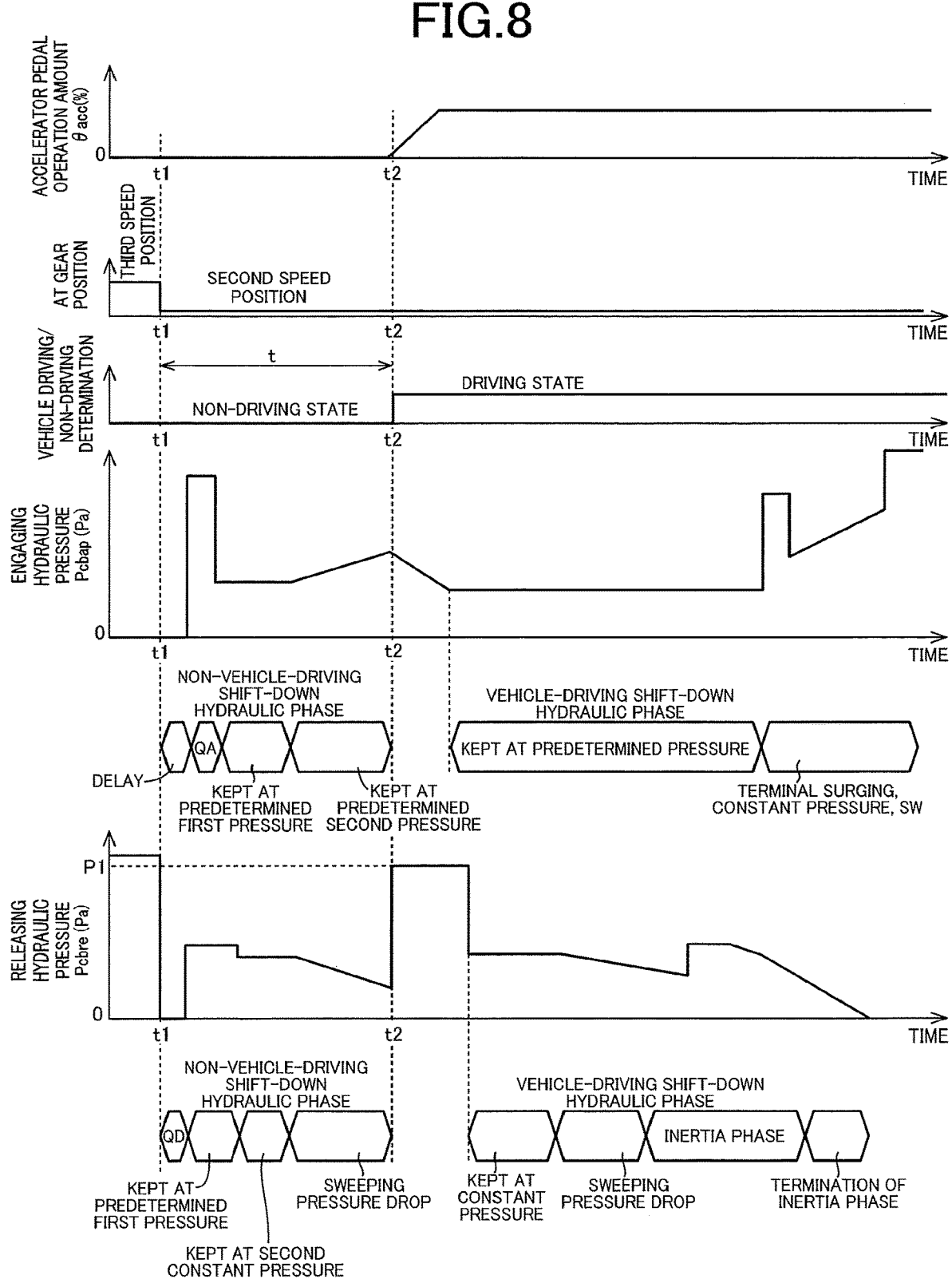
FIG. 8 is a time chart illustrating an example of changes of various parameters in one mode of hydraulic control of the step-variable transmission portion established according to the control routine of FIG. 7, where the vehicle is switched from the non-driving state to the driving state within a predetermined length of time after a moment of initiation of the shift-down action of the step-variable transmission portion.

FIG. 8 is the time chart illustrating an example of changes of various parameters in the vehicle-driving control mode newly established in place of the non-vehicle-driving control mode, according to the control routine of FIG. 7, where the vehicle 10 is switched from the non-driving state to the driving state within the predetermined length of time to after the moment of initiation of the shift-down action of the step-variable transmission portion 20.

In the example of FIG. 8, the determination of requirement for the shift-down action of the step-variable transmission portion 20 from the third speed AT gear position to the second speed AT gear position, for example, is made at a point of time t1 in the non-driving state of the vehicle 10. As a result, the hydraulic control of the step-variable transmission portion 20 by the transmission shifting control portion 82 is initiated to implement the shift-down action. Described more specifically, the releasing hydraulic pressure Pcbre of the releasing-side coupling device CB (clutch C2 in the case of the shift-down action from the third speed AT gear position to the second speed AT gear position) is lowered, while the engaging hydraulic pressure Pcbap of the engaging-side coupling device CB (brake B1 in the case of the shift-down action from the third speed AT gear position to the second speed AT gear position) is raised. At the point of time t1, quick draining (QD) of the releasing-side coupling device CB is implemented to zero its releasing hydraulic pressure Pcbre (command value), to improve the response of the actual value of the releasing hydraulic pressure Pcbre. Thereafter, the releasing hydraulic pressure Pcbre is kept at predetermined values. In the present example, the releasing hydraulic pressure Pcbre is kept at predetermined two values (predetermined first and second pressure values). After the releasing hydraulic pressure Pcbre is kept at the predetermined values for a predetermined time, the releasing hydraulic pressure Pcbre is gradually lowered at a predetermined rate (at a predetermined rate of sweeping drop).

At a point of time a short delay time has passed after the point of time t1, quick application (QA) of the engaging hydraulic pressure Pcbap (command value) to the engaging-side coupling device CB, that is, a quick temporary rise of the engaging hydraulic pressure Pcbap to a predetermined value is implemented to improve the response of the actual value of the engaging hydraulic pressure Pcbap. Thereafter, the engaging hydraulic pressure Pcbap is kept at a predetermined first pressure value. Then, the engaging hydraulic pressure Pcbap is gradually raised at a predetermined rate to a predetermined second pressure value. In the example of FIG. 8, although the engaging hydraulic pressure Pcbap is raised at an apparently high rate, the actual rate of rise of the engaging hydraulic pressure Pcbap during this time period is comparatively low. In this respect, the engaging hydraulic pressure Pcbap during this time period is considered to be substantially kept at a certain value. The above-described hydraulic control of the releasing-side and engaging-side coupling devices CB during the time period between the point of time t1 and a point of time t2 is considered to correspond to the non-vehicle-driving control mode (non-vehicle-driving shift-down hydraulic phase).

When it is determined at the point of time t2 that the vehicle 10 is switched from the non-driving state to the driving state with an increase of the accelerator pedal operation amount θacc as a result of an operation of the accelerator pedal, the mode of hydraulic control is switched from the non-vehicle-driving control mode to the vehicle-driving control mode. In the example of FIG. 8, a length of time t (=t2−t1) from the moment (point of time t1) of initiation of the shift-down action to the moment (point of time t2) of determination of switching of the vehicle 10 to the driving state is shorter than the predetermined value tα.

Prior to the point of time t2, the non-vehicle-driving control mode is established, so that the releasing hydraulic pressure Pcbre is lowered while the engaging hydraulic pressure Pcbap is gradually raised. After the mode of hydraulic control of the coupling devices CB is switched to the vehicle-driving control mode, the releasing hydraulic pressure Pcbre is raised to a value at which the hydraulic control in the vehicle-driving control mode is initiated again to permit the shift-down action to be controlled, while the engaging hydraulic pressure Pcbap is lowered to a value slightly lower than a value at which the engaging-side coupling device CB begins to have a torque capacity (at which the hydraulic cylinder of the engaging-side coupling device CB is substantially filled with the working fluid).

After the point of time t2, a quick temporary rise of the command value of the releasing hydraulic pressure Pcbre to a predetermined value P1 (namely, quick application of the releasing hydraulic pressure Pcbre to the releasing-side coupling device CB) is implemented, to rapidly raise the actual value of the releasing hydraulic pressure Pcbre to a value at which the shift-down action can be controlled. Thereafter, the releasing hydraulic pressure Pcbre is kept at a predetermined value for a predetermined time period, and is then gradually lowered at the predetermined rate (subjected to a sweeping drop). After the moment of initiation of the inertia phase, the releasing hydraulic pressure Pcbre is controlled to permit the shift-down action to progress at a predetermined rate, and is lowered toward zero, during a time period from a point of time shortly before a moment of termination of the inertia phase.

On the other hand, the engaging hydraulic pressure Pcbap of the engaging-side coupling device CB is lowered, after the point of time t2, to a value slightly lower than a value at which the engaging-side coupling device CB begins to have a torque capacity (at which the hydraulic cylinder of the engaging-side coupling device CB is substantially filled with the working fluid). At this time, the engaging hydraulic pressure Pcbap is gradually lowered at a rate low enough to prevent generation of a torque phase shock due to lowering of the engaging hydraulic pressure Pcbap. After the engaging hydraulic pressure Pcbap has been lowered to the value slightly lower than the value at which the engaging-side coupling device CB begins to have the torque capacity (engaging torque), the engaging hydraulic pressure Pcbap is kept at that value. At a time shortly before the moment of termination of the inertia phase, the hydraulic control to rapidly bring the engaging-side coupling device CB into its engaged state is initiated. Described more specifically, the engaging hydraulic pressure Pcbap is temporarily raised (referred as a terminal surging), then raised at a predetermined rate, and is subsequently raised to a value at which the engaging-side coupling device CB is placed in its fully engaged state. It is noted that the hydraulic controls of the releasing-side and engaging-side coupling devices CB after the point of time t2 are considered to correspond to the vehicle-driving control mode (vehicle-driving shift-down hydraulic phase).

As described above, when the vehicle 10 is switched from the non-driving state to the driving state at the point of time t2, the mode of hydraulic control of the step-variable transmission portion 20 is switched from the non-vehicle-driving control mode to the vehicle-driving control mode, so that the hydraulic control of the step-variable transmission portion 20 is initiated again in the vehicle-driving control mode, so as to reduce the risk of generation of the shifting shock. It is further noted that the mode of hydraulic control is switched to the vehicle-driving control mode before the moment of initiation of the inertia phase, at latest, so that an influence of switching of the mode of hydraulic control is reduced, and deterioration of the shifting response is also reduced.

Figure 9:
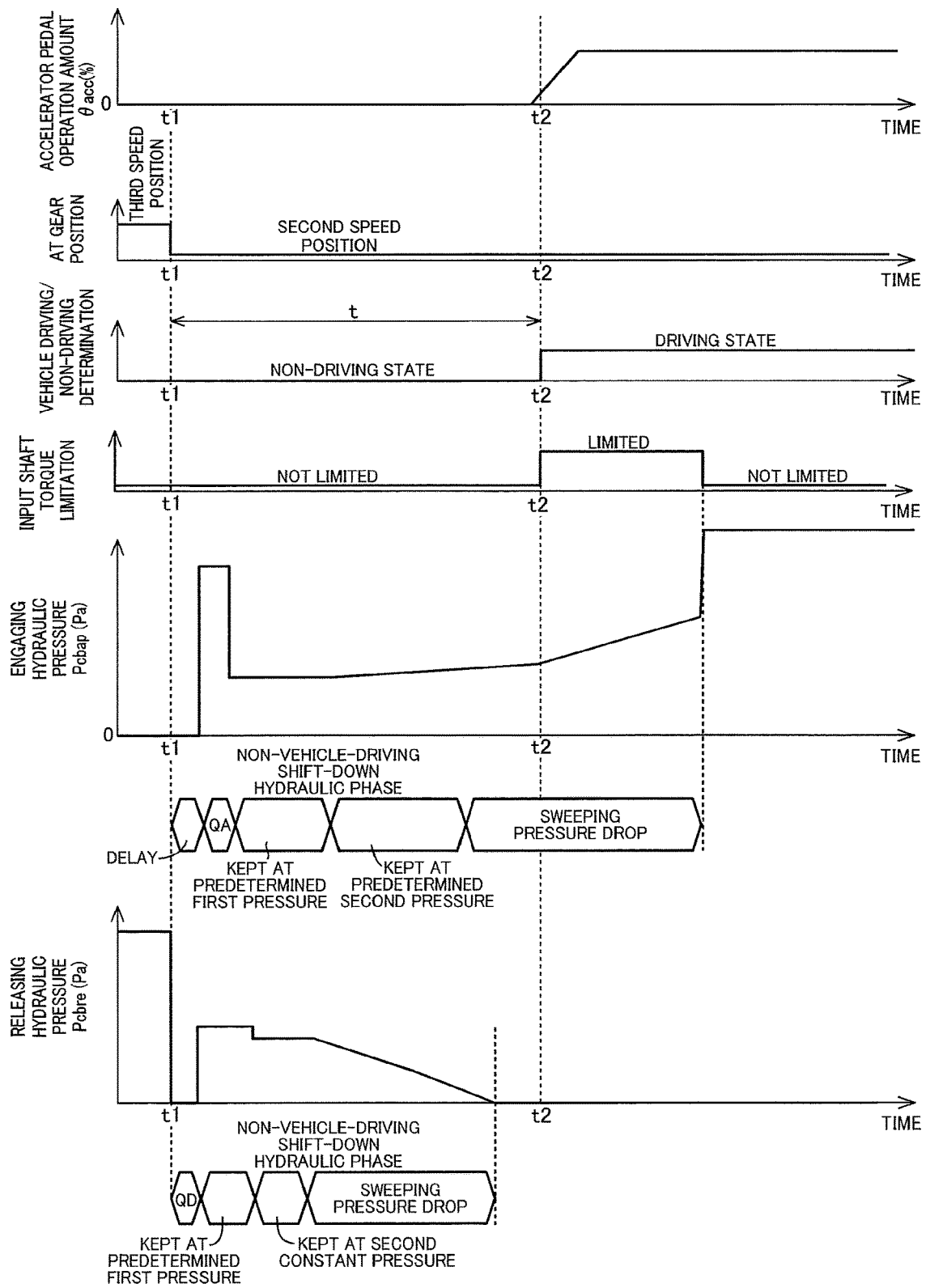
FIG. 9 is a time chart illustrating an example of changes of the various parameters in another mode of hydraulic control of the step-variable transmission portion established according to the control routine of FIG. 7, where the vehicle is switched from the non-driving state to the driving state after the predetermined length of time has passed after the moment of initiation of the shift-down action of the step-variable transmission portion.

FIG. 9 is another time chart illustrating an example of changes of various parameters in the non-vehicle-driving control mode maintained according to the control routine of FIG. 7, where the vehicle 10 is switched from the non-driving state to the driving state after the predetermined length of time tα has passed after the moment of initiation of the shift-down action of the step-variable transmission portion 20.

In the example of FIG. 9, the determination of requirement for the shift-down action of the step-variable transmission portion 20 from the third speed AT gear position to the second speed AT gear position, for example, is made at a point of time t1 in the non-driving state of the vehicle 10, then the control of the shifting by the transmission shifting control portion 82 is initiated. Described more specifically, the releasing hydraulic pressure Pcbre of the releasing-side coupling device CB (clutch C2 in the case of the shift-down action from the third speed AT gear position to the second speed AT gear position) is lowered, while the engaging hydraulic pressure Pcbap of the engaging-side coupling device CB (brake B1 in the case of the shift-down action from the third speed AT gear position to the second speed AT gear position) is raised. At the point of time t1, quick draining (QD) of the releasing-side coupling device CB is implemented to zero its releasing hydraulic pressure Pcbre (command value), to improve the response of the actual value of the releasing hydraulic pressure Pcbre. Thereafter, the releasing hydraulic pressure Pcbre is kept at predetermined values. After the releasing hydraulic pressure Pcbre is kept at the predetermined values for a predetermined time, the releasing hydraulic pressure Pcbre is gradually lowered toward zero at a predetermined rate (at a predetermined rate of sweeping drop).

At a point of time a short delay time has passed after the point of time t1, quick application (QA) of the engaging hydraulic pressure Pcbap (command value) to the engaging-side coupling device CB, that is, a quick temporary rise of the engaging hydraulic pressure Pcbap to a predetermined value is implemented to improve the response of the actual value of the engaging hydraulic pressure Pcbap. Thereafter, the engaging hydraulic pressure Pcbap is kept at a predetermined first pressure value. Then, the engaging hydraulic pressure Pcbap is gradually raised at a predetermined rate to a predetermined second pressure value. The above-described hydraulic control of the releasing-side and engaging-side coupling devices CB during the time period after the point of time t1 is considered to correspond to the non-vehicle-driving control mode (non-vehicle-driving shift-down hydraulic phase).

At a point of time t2, it is determined that the vehicle 10 is switched from the non-driving state to the driving state with an increase of the accelerator pedal operation amount θacc as a result of an operation of the accelerator pedal. In the example of FIG. 9, the length of time t (=t2−t1) from the moment (point of time t1) of initiation of the shift-down action to the moment (point of time t2) of determination of switching of the vehicle 10 to the driving state is not shorter than the predetermined value tα.

Where the hydraulic control of the step-variable transmission portion 20 is implemented by the second shift control portion 88, the non-vehicle-driving control mode is maintained, so that the engaging hydraulic pressure Pcbap is continuously gradually raised (referred as a sweeping rise) even at the point of time t2. After the point of time t2, the rate of rise of the engaging hydraulic pressure Pcbap is made higher than that before the point of time t2, to permit the shift-down action to progress at a higher rate. On the other hand, the releasing hydraulic pressure Pcbre of the releasing-side coupling device CB has been lowered to zero at a point of time prior to the point of time t2, and is kept zero even after the point of time t2. At the point of time t2, the input shaft torque Ti of the step-variable transmission portion 20 is limited to the predetermined value Tα, so that it is possible to reduce a risk of excessive rise (overshooting) of the input shaft speed ωi and an engaging shock of the engaging-side coupling device CB (a shifting shock of the step-variable transmission portion 20).

As described above, the non-vehicle-driving control mode is maintained to implement the shift-down action of the step-variable transmission portion 20 under the control of the second shift control portion 88, where the vehicle 10 is switched from the non-driving state to the driving state after the shift-down action has sufficiently progressed. Accordingly, the shift-down action can rapidly progress, with a reduced risk of deterioration of the shifting response. Although the non-vehicle-driving mode of hydraulic control maintained even after switching of the vehicle 10 from the non-driving state to the driving state may cause generation of the shifting shock, this risk may be reduced owing to the limitation of the input shaft torque Ti.

As described above, the present embodiment is configured to selectively establish one of the non-vehicle-driving control mode and the vehicle-driving control mode as the mode of hydraulic control of the step-variable transmission portion 20, depending upon whether the vehicle 10 is switched from its non-driving state to its driving state within or after the predetermined length of time tα after the moment of initiation of the shift-down action. Accordingly, the present embodiment permits not only a high degree of shifting response but also reduction of a shifting shock of the step-variable transmission portion 20. Where the vehicle 10 is switched from the non-driving state to the driving state after the predetermined length of time tα has passed after the moment of initiation of the shift-down action, for instance, the hydraulic control of the step-variable transmission portion 20 is implemented by the second shift control portion 88. In this case, the non-vehicle-driving control mode is maintained, and the input shaft torque Ti is limited to the predetermined value Tα. Thus, the deterioration of the shifting response can be reduced by maintaining the non-vehicle-driving control mode to permit the shift-down action to adequately progress. Further, the limitation of the input shaft torque Ti to the predetermined value Tα reduces an amount of power variation of the drive power source portion 39, permitting an adequate progress of the shift-down action while reducing a loss of power balance of the drive power source portion 39 and the risk of generation of the shifting shock, in spite of maintenance of the non-vehicle-driving control mode. Further, the input shaft torque Ti is limited to the predetermined value Tα only after a predetermined length of time has passed after the moment of initiation of the shift-down action, so that the deterioration of the shifting response can be reduced. Where the vehicle 10 is switched from the non-driving state to the driving state within the predetermined length of time tα after the moment of initiation of the shift-down action, on the other hand, the hydraulic control of the step-variable transmission portion 20 is implemented by the first shift control portion 86, so that the mode of hydraulic control of the step-variable transmission portion 20 is switched from the non-vehicle-driving control mode to the vehicle-driving control mode, whereby the shifting shock can be reduced. Further, the mode of hydraulic control to the vehicle-driving control mode is switched within the predetermined length of time tα after the moment of initiation of the shift-down action, namely, while the shift-down action is still in an initial stage of progress, so that it is possible to reduce the risks of generation of the shifting shock and deterioration of the shifting response due to switching of the mode of hydraulic control of the step-variable transmission portion 20.

While the preferred embodiment of this invention has been described in detail by reference to the drawings, it is to be understood that the invention may be otherwise embodied.

Figure 10:
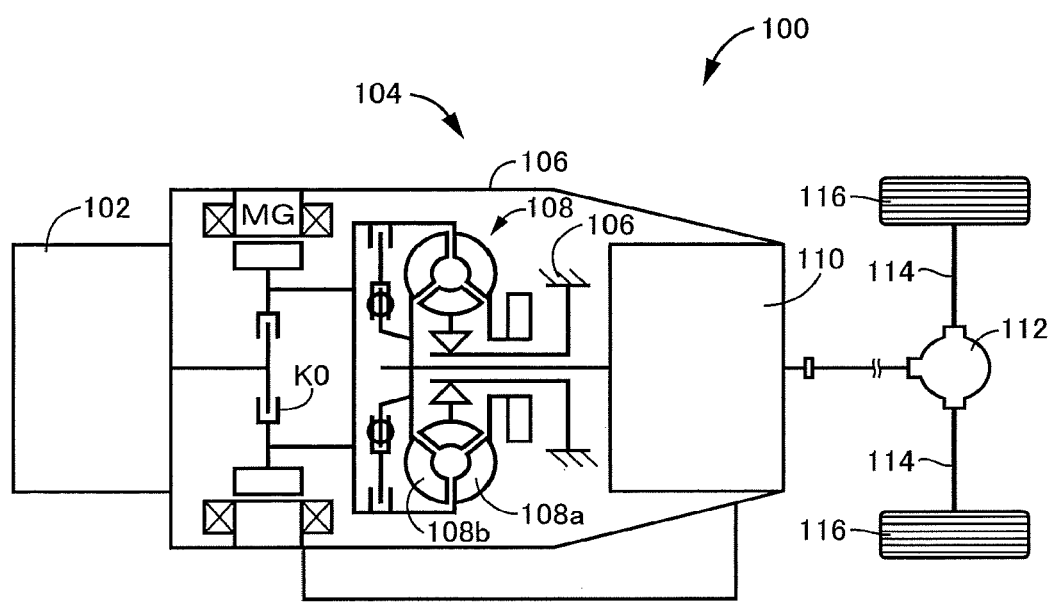
FIG. 10 is a schematic view showing an arrangement of another type of vehicular drive system different from that of FIG. 1, which is to be controlled by the shift control apparatus according to the present invention.

In the embodiments, the shift control apparatus is configured to control the vehicle 10 provided with the continuously variable transmission portion 18 and the step-variable transmission portion 20 which are disposed in series with each other. However, the shift control apparatus according to the present invention may be configured to control a vehicle 100 shown in FIG. 10. The vehicle 100 is a hybrid vehicle provided with an engine 102 and an electric motor MG each functioning as a drive power source, and a power transmitting system 104. As shown in FIG. 10, the power transmitting system 104 includes a clutch K0, a torque converter 108 and a step-variable transmission portion 110, which are disposed within a stationary member in the form of a casing 106 fixed to a body of the vehicle 100, in this order of description as seen in the direction from the engine 102. The power transmitting system 104 further includes a differential gear device 112 and axles 114. The torque converter 108 has a pump impeller 108a selectively connected to the engine 102 through the clutch K0 and directly connected to the electric motor MG, and a turbine impeller 108b directly connected to the step-variable transmission portion 110. In the power transmitting system 104, a drive force of the engine 102 and/or a drive force of the electric motor MG are/is transmitted to drive wheels 116 through the clutch K0 (where the drive force of the engine 102 is transmitted), the torque converter 108, the step-variable transmission portion 110, the differential gear device 112 and the axles 114, in this order of description. The step-variable transmission portion 110 is a planetary gear type automatic transmission.

The vehicle 100 may not be provided with the engine 102, the clutch K0 and the torque converter 108. In this case, the electric motor MG is directly connected to an input rotary member of the step-variable transmission portion 110. Namely, the shift control apparatus according to the present invention is applicable to a vehicle which is provided with a drive power source, and a step-variable transmission portion which constitutes a part of a power transmitting path between the drive power source and drive wheels. While the vehicle 100 uses the torque converter 108 as a fluid-operated power transmitting device, the vehicle 100 may use other types of fluid-operated power transmitting devices such as a fluid coupling not having not having a torque boosting function. Further, the torque converter 108 need not be provided, or may be replaced by a device having a simple clutch function.

In the illustrated embodiments, the step-variable transmission portion 20 is a planetary gear type automatic transmission having the four AT gear positions for forward driving of the vehicle 10. However, the step-variable transmission portion 20 need not have the four AT gear positions, as long as the step-variable transmission portion 20 has a plurality of gear positions each of which is selectively established with engagement of selected at least one of a plurality of coupling devices. That is, the step-variable transmission portion 20 which is the planetary gear type automatic transmission in the embodiments may be replaced by any other type of automatic transmission such as a known DCT (Dual Clutch Transmission) which is a synchronous meshing parallel two-axes type automatic transmission having two input shafts which are provided with respective coupling devices (clutches) and which are operatively connected to respective two shifting units having respective even-numbered gear positions and odd-numbered gear positions. The DCT type automatic transmission includes two coupling devices each connected to respective inputs of the two shifting units, one of the two coupling devices which is to be released during the shift-down action corresponds to the releasing-side coupling device and another of the two coupling devices which is to be engaged during the shift-down action corresponds to the engaging-side coupling device of the present invention.

In the vehicle 10 according to the illustrated embodiments, the drive power source includes the engine 14 and the second electric motor MG2, the shift control apparatus according to the present invention is equally applicable to a vehicle wherein the drive power source consists solely of the engine 14. The present shift control apparatus is also equally applicable to a vehicle wherein a belt-and-pulley type continuously variable transmission and a gear mechanism having at least one predetermined speed ratio are disposed in parallel with each other between an engine and drive wheels, and the continuously variable transmission and the gear mechanism are shifted with engaging and releasing actions of hydraulically operated coupling devices. The gear mechanism may have a single speed ratio value, or two or more speed positions having respective speed ratio values.

It is to be understood that the embodiments and modifications described above are given for illustrative purpose only, and that the present invention may be embodied with various other changes and improvements which may occur to those skilled in the art.

NOMENCLATURE OF ELEMENTS

14: Engine
28: Drive wheels
30: Intermediate power transmitting member (Input shaft)
32: Differential mechanism
39: Drive power source portion
80: Electronic control device (Control apparatus)
82: Transmission shifting control portion (Shift control portion)
86: First shift control portion (Shift control portion)
88: Second shift control portion (Shift control portion)
B1: Engaging-side coupling device (in the case of 3→2 shift-down action)

C2: Releasing-side coupling device (in the case of 3→2 shift-down action)

CB (B1, B2, C1, C2): Coupling devices (Hydraulically operated coupling devices)

MG1: First electric motor

MG2: Second electric motor

RE1: First rotary element

RE2: Second rotary element

RE3: Third rotary element tα: Predetermined time

Tα: Predetermined value of drive power source torque

P1: Predetermined hydraulic pressure value

What is claimed is:

1. A shift control apparatus for a vehicle provided with a drive power source, and a step-variable transmission portion disposed in a power transmitting path between the drive power source and drive wheels and including a plurality of hydraulically operated coupling devices, the shift control apparatus controlling the step-variable transmission portion to implement a shifting action with an engaging action of an engaging-side coupling device to be brought into an engaged state to implement the shifting action, and a releasing action of a releasing-side coupling device to be brought into a released state, said shift control apparatus comprising:
a shift control portion configured to control a shift-down action of the step-variable transmission portion in a predetermined mode of hydraulic control of the engaging-side and releasing-side coupling devices,
and wherein the shift control portion controls the engaging-side and releasing-side coupling devices in a non-vehicle-driving control mode during the shift-down action of the step-variable transmission portion in a non-driving state of the vehicle, the shift control portion switching the mode of hydraulic control from the non-vehicle-driving control mode to a vehicle-driving control mode where the vehicle is switched from the non-driving state to a driving state during the shift-down action, within a predetermined length of time after a moment of initiation of the shift-down action, and maintaining the non-vehicle-driving control mode where the vehicle is switched to the driving state after the predetermined length of time has passed from the moment of initiation of the shift-down action, while limiting a torque of the drive power source during the shift-down action to a predetermined value in the non-vehicle-driving control mode.

2. The shift control apparatus according to claim 1, wherein the predetermined length of time is set such that the predetermined length of time expires at latest before a moment of initiation of an inertia phase of the shift-down action of the step-variable transmission portion.

3. The shift control apparatus according to claim 2, wherein the shift control portion is configured to primarily control a hydraulic pressure of the releasing-side coupling device during the shift-down action of the step-variable transmission portion in the vehicle-driving control mode, to permit the shift-down action to adequately progress, and configured to primarily control a hydraulic pressure of the engaging-side coupling device during the shift-down action in the non-vehicle-driving control mode, to permit the shift-down action to adequately progress.

4. The shift control apparatus according to claim 3, wherein the shift control apparatus is configured to temporarily raise the hydraulic pressure of the releasing-side coupling device to a predetermined value in the vehicle-driving mode when the shift control portion switches the mode of hydraulic control to the vehicle-driving control mode during the shift-down action of the step-variable transmission portion.

5. The shift control apparatus according to claim 4, wherein the drive power source includes an engine, a first electric motor, a differential mechanism, and a second electric motor operatively connected to an input shaft of the step-variable transmission portion in a power transmittable manner, the differential mechanism including a first rotary element operatively connected to the engine in a power transmittable manner, a second rotary element operatively connected to the first electric motor in a power transmittable manner, and a third rotary element operatively connected to the input shaft of the step-variable transmission portion.

6. The shift control apparatus according to claim 3, wherein the drive power source includes an engine, a first electric motor, a differential mechanism, and a second electric motor operatively connected to an input shaft of the step-variable transmission portion in a power transmittable manner, the differential mechanism including a first rotary element operatively connected to the engine in a power transmittable manner, a second rotary element operatively connected to the first electric motor in a power transmittable manner, and a third rotary element operatively connected to the input shaft of the step-variable transmission portion.

7. The shift control apparatus according to claim 2, wherein the drive power source includes an engine, a first electric motor, a differential mechanism, and a second electric motor operatively connected to an input shaft of the step-variable transmission portion in a power transmittable manner, the differential mechanism including a first rotary element operatively connected to the engine in a power transmittable manner, a second rotary element operatively connected to the first electric motor in a power transmittable manner, and a third rotary element operatively connected to the input shaft of the step-variable transmission portion.

8. The shift control apparatus according to claim 1, wherein the shift control portion is configured to primarily control a hydraulic pressure of the releasing-side coupling device during the shift-down action of the step-variable transmission portion in the vehicle-driving control mode, to permit the shift-down action to adequately progress, and configured to primarily control a hydraulic pressure of the engaging-side coupling device during the shift-down action in the non-vehicle-driving control mode, to permit the shift-down action o adequately progress.

9. The shift control apparatus according to claim 8, wherein the shift control apparatus is configured to temporarily raise the hydraulic pressure of the releasing-side coupling device to a predetermined value in the vehicle-driving mode when the shift control portion switches the mode of hydraulic control to the vehicle-driving control mode during the shift-down action of the step-variable transmission portion.

10. The shift control apparatus according to claim 9, wherein the drive power source includes an engine, a first electric motor, a differential mechanism, and a second electric motor operatively connected to an input shaft of the step-variable transmission portion in a power transmittable manner, the differential mechanism including a first rotary element operatively connected to the engine in a power transmittable manner, a second rotary element operatively connected to the first electric motor in a power transmittable manner, and a third rotary element operatively connected to the input shaft of the step-variable transmission portion.

11. The shift control apparatus according to claim 8, wherein the drive power source includes an engine, a first electric motor, a differential mechanism, and a second electric motor operatively connected to an input shaft of the step-variable transmission portion in a power transmittable manner, the differential mechanism including a first rotary element operatively connected to the engine in a power transmittable manner, a second rotary element operatively connected to the first electric motor in a power transmittable manner, and a third rotary element operatively connected to the input shaft of the step-variable transmission portion.

12. The shift control apparatus according to claim 1, wherein the drive power source includes an engine, a first electric motor, a differential mechanism, and a second electric motor operatively connected to an input shaft of the step-variable transmission portion in a power transmittable manner, the differential mechanism including a first rotary element operatively connected to the engine in a power transmittable manner, a second rotary element operatively connected to the first electric motor in a power transmittable manner, and a third rotary element operatively connected to the input shaft of the step-variable transmission portion.

* * * * *